United States Patent
Ojha et al.

(10) Patent No.: US 11,178,185 B2
(45) Date of Patent: Nov. 16, 2021

(54) EXTENDING MANAGEMENT CONTROL TO IOT DEVICES

(71) Applicant: Citrix Systems, Inc., Fort Lauderdale, FL (US)

(72) Inventors: Nivedita Ojha, Campbell, CA (US); Stephen Wilson, San Jose, CA (US); Derek Thorslund, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 82 days.

(21) Appl. No.: 16/730,184

(22) Filed: Dec. 30, 2019

(65) Prior Publication Data

US 2020/0213360 A1 Jul. 2, 2020

Related U.S. Application Data

(60) Provisional application No. 62/786,813, filed on Dec. 31, 2018.

(51) Int. Cl.
*H04L 29/06* (2006.01)
*H04W 4/02* (2018.01)
(Continued)

(52) U.S. Cl.
CPC .......... *H04L 63/20* (2013.01); *H04L 41/0668* (2013.01); *H04L 41/0681* (2013.01); *H04L 41/5019* (2013.01); *H04L 45/22* (2013.01); *H04L 45/24* (2013.01); *H04L 45/28* (2013.01); *H04L 63/0272* (2013.01); *H04L 63/08* (2013.01); *H04L 63/0853* (2013.01); *H04L 63/10* (2013.01); *H04W 4/02* (2013.01); *H04W 24/04* (2013.01); *H04W 36/305* (2018.08);
(Continued)

(58) Field of Classification Search
CPC ..... H04L 63/20; H04L 63/0272; H04L 63/08; H04L 63/0853; H04L 63/10; G06F 21/566
USPC .......................................................... 726/1
See application file for complete search history.

(56) References Cited

U.S. PATENT DOCUMENTS 10,044,674 B2    8/2018   Liu et al.
10,218,697 B2 *   2/2019   Cockerill ............ H04L 63/1433
(Continued)

FOREIGN PATENT DOCUMENTS

| EP | 3343962 | 7/2018 |
|---|---|---|
| KR | 101688812 | 12/2016 |
| WO | 20140116528 | 7/2014 |

OTHER PUBLICATIONS

Machine Translation of KR101688812B1; 21 pages.

*Primary Examiner* — Longbit Chai
(74) *Attorney, Agent, or Firm* — BainwoodHuang

(57) ABSTRACT

A technique uses a managed computing device to extend management control by an organization to IoT (Internet of Things) devices in a local environment of the computing device. The computing device discovers any local IoT devices and participates in a communication with a server to bring one or more of the IoT devices under management control. In some examples, extending management control involves enrolling selected IoT devices into a management framework of the organization and directing communications between the server and the respective IoT devices through the managed device, which provides a point-of-presence for administering management of the selected IoT devices in the local environment.

21 Claims, 14 Drawing Sheets

(51) Int. Cl.

|   |   |
|---|---|
| *H04W 64/00* | (2009.01) |
| *H04W 36/30* | (2009.01) |
| *H04L 12/24* | (2006.01) |
| *H04L 12/707* | (2013.01) |
| *H04L 12/703* | (2013.01) |
| *H04W 24/04* | (2009.01) |
| *G06F 8/65* | (2018.01) |
| *G06F 21/56* | (2013.01) |

(52) U.S. Cl.
CPC ............. *H04W 64/003* (2013.01); *G06F 8/65* (2013.01); *G06F 21/566* (2013.01); *G06F 2221/034* (2013.01)

(56) References Cited

U.S. PATENT DOCUMENTS

| | | |
|---|---|---|
| 2005/0163093 A1 | 7/2005 | Garg et al. |
| 2010/0124196 A1 | 5/2010 | Bonar et al. |
| 2013/0103785 A1 | 4/2013 | Lyon |
| 2015/0121482 A1 | 4/2015 | Berman et al. |
| 2016/0182655 A1 | 6/2016 | Entezari et al. |
| 2017/0195121 A1 | 7/2017 | Frei et al. |
| 2017/0310445 A1 | 10/2017 | Kalligudd |
| 2018/0248892 A1 | 8/2018 | Hefetz |

\* cited by examiner

EXTENDING MANAGEMENT CONTROL TO IOT DEVICES

CROSS-REFERENCE TO RELATED APPLICATION(S)

This application claims the benefit of U.S. Provisional Application No. 62/786,813, filed Dec. 31, 2018, the contents and teachings of which are incorporated herein by reference in their entirety.

BACKGROUND

It is common for modern computing devices to support multiple network connections. For example, a laptop computer might support Ethernet, Wi-Fi (IEEE 802.11x), and/or cellular network connections. If one network connection fails, a user has the option to change networks, e.g., by accessing network settings on the laptop and selecting a different network.

Some devices change network connections automatically. For example, a user of a smartphone might start listening to a podcast at home, where the smartphone is connected to Wi-Fi, but then might decide to continue listening outside. When the user gets out of Wi-Fi range, the smartphone detects the loss of Wi-Fi and switches over to cellular service. With adequate buffering, the transition may appear seamless, and the user may never notice that there has been a connection failure and then a failover from Wi-Fi to cellular service.

SUMMARY

Unfortunately, certain applications do not support seamless transitions when the devices on which they run switch networks. For example, applications like web conferencing, which involve real-time interactivity, may temporarily freeze when network connections change. In some cases, establishing a new connection may require handshaking or other communications, which can extend the durations of outages. Even if outages are only momentary, they can still cause frustration and annoyance and diminish user experience.

In contrast with these conventional approaches, a technique disclosed herein maintains multiple network paths simultaneously, exchanging the same data redundantly through the network paths and allowing a receiver to select one of the network paths as its source of data. In the event that a first, currently-selected network path becomes weak, for example, the receiver can automatically and seamlessly switch its source of data to a second network path, while the first network path remains operational. Given that the second network path is already on and conveying data, the transition is nearly instantaneous. Even highly interactive applications running in environments having network dead zones or interference can remain fully functional with generally no downtime.

In some arrangements, a user device may be managed in whole or in part by an organization, such as a company, school, government agency, or other entity. The user device may be subject to security requirements, upgrades, and/or other activities and policies, which the organization controls. Management control may extend to the entire device or only to designated applications and/or features running on the device. The term "managed device" as used herein refers to both a device that is wholly controlled by an organization and to a device that is partially controlled, e.g., where control extends only to one or more applications or other features.

Users of managed devices often work off-site from an organization, such as at home or at other locations not owned or controlled by the organization. Such locations may be populated with numerous IoT (Internet of Things) devices, such as smart speakers (e.g., Amazon Echo and/or Google Home), smart TVs, cameras, lights, security systems, thermostats, and the like. As used herein, "IoT device" refers to any device, machine, appliance, system, garment, or the like, which performs one or more functions and is able to communicate over a computer network.

A managed device operating off-site normally has the ability to connect to IoT devices about the managed device, i.e., in its local environment. For example, the managed device may play audio through a smart speaker or play video through a smart TV in the same room. Unfortunately, such IoT devices are not subject to the same management controls as the managed device. They may run out-of-date software, run malicious code, and more generally expose the managed device to risks. This is especially the case as many IoT devices are not designed with security in mind. A user may be tempted to connect a managed device to a local IoT device, but doing so may place the organization at risk.

In contrast with prior approaches, an improved technique employs a managed device that extends management control by an organization to IoT (Internet of Things) devices in a local environment of the managed device. The managed device discovers any local IoT devices and participates in a communication with a server to bring one or more of the devices under management control. In some examples, extending management control involves enrolling selected IoT devices into a management framework of the organization and directing communications between the server and the respective IoT devices through the managed device, which provides a point-of-presence for administering management of the selected IoT devices in the local environment.

Certain embodiments are directed to a method that includes processing, by a computing device, a request to scan for IoT (Internet of Things) devices in an environment about the computing device. The computing device is managed by an entity and communicatively coupled to a server of the entity over a computer network. The method further includes discovering, by the computing device, a set of IoT devices in the environment, the set of IoT devices being unmanaged by the entity, and participating, by the computing device, in a communication with the server to extend management control by the entity to the set of IoT devices. The management control enables the set of IoT devices to operate in compliance with one or more policies of the entity.

Other embodiments are directed to a method that includes receiving, by a server, a request from a computing device to enroll an IoT device into an organization into which the computing device is already enrolled. The IoT device is disposed in an environment about the managed device. In response to receiving the request, the method further includes participating by the server in a communication with the computing device to enroll the IoT device into the organization such that the IoT device becomes subject to one or more policies of the organization, and communicating, by the server, with the enrolled IoT device via the computing device.

Additional embodiments include any method described above realized as a computerized apparatus, system, or device constructed and arranged to carry out the respective method, as well as a computer program product including a set of non-transitory, computer-readable media having instructions which, when executed by control circuitry, cause the control circuitry to perform the respective method.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of disclosed techniques will now be described. One should appreciate that such embodiments are provided by way of example to illustrate certain features and principles but are not intended to be limiting.

This document is provided in the following sections to assist the reader:
Section I presents an example environment and technique for improving network reliability through the use of multiple, simultaneous network paths.
Section II presents an example technique for extending management control to IoT devices.
The techniques disclosed in Sections I and II may be used together or independently. Although each technique may benefit from the features of the other, neither technique is required to be used with the other.

Section I: Example Environment and Technique for Maintaining Multiple, Simultaneous Network Paths A technique for operating an application maintains multiple, simultaneous network paths, exchanging the same data redundantly through the network paths and enabling a receiver to select one of the network paths as a source of the data.

Figure 1:
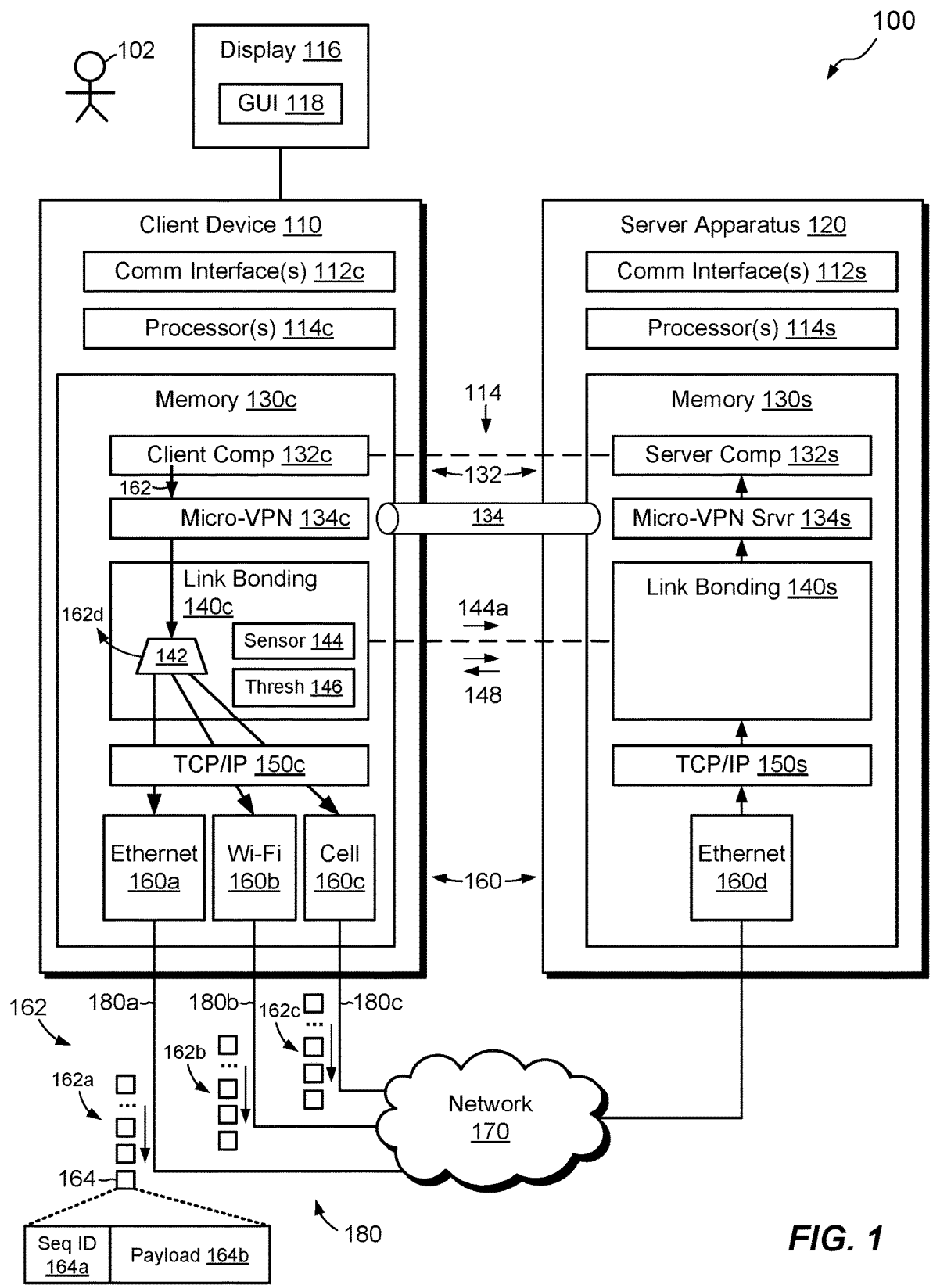
FIG. 1 is a block diagram of an example environment in which embodiments of the disclosed technique can be practiced.

FIG. 1 shows an example environment 100 in which embodiments of the disclosed technique can be practiced. Here, a client device 110 ("client") is operatively connected to a server apparatus 120 ("server") over a network 170, such as a local area network (LAN), a wide area network (WAN), the Internet, and/or some other type of network or combination of networks. The client 110 may be provided as any user-operable computer or device, such as a laptop computer, desktop computer, tablet computer, smart phone, personal data assistant, set-top box, gaming system, or the like. The server 120 may be provided in a similar form, but is typically a server-grade computer that runs in a data center and is available "in the cloud," meaning on the Internet. In some examples, the server 120 is implemented using multiple computers, as part of a distributed server or server cluster.

The client 110 is connected to the network 170 via multiple paths 180, which may include an Ethernet path 180a, a Wi-Fi path 180b, and a cellular data path 180c, for example. A greater or fewer number of paths 180 may be provided, and the disclosure is not limited to any particular type or types of paths. In an example, the cellular data path 180c is an LTE (Long-Term Evolution) data path. The client 110 has a display 116, such as a monitor, touch screen, or the like, and the display 116 is configured to render a graphical user interface (GUI) 118, which may be operated by a user 102.

As shown, the client 110 includes one or more communication interfaces 112c, such as an Ethernet port, a Wi-Fi antenna, a cellular antenna, and/or the like. The client 110 also includes a set of processors 114c, such as one or more processing chips and/or assemblies, and memory 130c, which may include both volatile memory, e.g., RAM (Random Access Memory), and non-volatile memory, such as one or more ROMs (Read-Only Memories), disk drives, solid state drives, and the like. The set of processors 114c and the memory 130c together form client control circuitry, which is constructed and arranged to carry out various client methods and functions as described herein. Also, the memory 130c includes a variety of software constructs realized in the form of executable instructions. When the executable instructions are run by the set of processors 114c, the processor(s) carry out the operations of the software constructs. Although certain software constructs are specifically shown and described, it is understood that the memory 130c typically includes many other software components, which are not shown, such as an operating system, various applications, processes, and daemons.

The configuration of the server 120 may be similar to that of the client 110, with communication interface(s) 112s, processor(s) 114s, and memory 130s. The processor(s) 114s and memory 130s form server control circuitry, which is constructed and arranged to carry out various server methods and functions as described herein. When the executable instructions on the server 120 are run by the processor(s) 114s, the processor(s) carry out the operations of the software constructs.

As further shown in FIG. 1, the memory 130c of client 110 "includes," i.e., realizes by execution of software instructions, a client component 132c of a software application 132, a micro-VPN (Virtual Private Network) client 134c, and a link bonding client 140c. The memory 130c further includes a TCP/IP (transmission control protocol/Internet protocol) driver 150c, as well as additional drivers 160, such as Ethernet driver 160a, Wi-Fi driver 160b, and cellular data driver 160c.

Turning now to the server 120, the memory 130s includes a server component 132s of the software application 132, a micro-VPN server 134s, and a link bonding service 140s. The memory 130s further includes a TCP/IP driver 150s, as well as one or more drivers 160 for one or more connection paths 180. In a particular example, the server 120 uses only a single connection path, such as Ethernet, which is accessed via an Ethernet driver 160d.

In an example, the micro-VPN client 134c and the link bonding client 140c are provided as respective software libraries, with each library having its own API (Application Program Interface) for exposing its respective functions. In addition, the micro-VPN client 134c and the link bonding client 140c may each be "scoped" to the client component 132c of the application program 132, meaning that their functionality is limited to communications involving the application program 132 and does not generally extend to other programs running on the client device 110. For example, the micro-VPN client 134c coordinates with the micro-VPN server 134s to establish an encrypted channel, such as a network tunnel 134, which is limited to communications over the network 170 between the client component 132c and the server component 132s. Rather than the tunnel 134 applying to the entire client device 110 (which is a common arrangement for conventional VPNs), the tunnel 134 can instead be restricted to network traffic of the application program 132 that passes between the client 110 and the server 120. In this arrangement, other network activity conducted by other programs running on the client device 110 may fall outside of the tunnel 134, where such activity is not secured by the tunnel 134. The micro-VPN thus provides the network tunnel 134 for a particular application, rather than for the client machine 110 as a whole. Among other things, this feature enables the micro-VPN, along with the link bonding client 140c and client application code 132c, to be provided in a single downloadable package (see FIG. 2), which can be installed on the client device 110, avoiding the need for multiple installation procedures and keeping all the related parts together. In an example, the micro-VPN client 134c and server 134s are configured to establish the encrypted channel by performing encryption and decryption of data passed through the tunnel 134. They may also be configured to restrict connections to designated resources on the network 170, e.g., by applying a white list of allowed sites and/or a black list of blocked sites. One should appreciate that the term "channel" as used herein is not limited to any one network path but rather encompasses all communication over all of the network paths 180. The link bonding client 140c is configured to direct outgoing data (from the client component 132c) over multiple network paths 180, and to receive incoming data arriving over the network paths 180, selecting one of the network paths as a source of data to be provided to the client component 132c. In a similar manner, the link bonding server 140s is configured to direct outgoing data (from the server component 132s) over the network paths 180, and to receive incoming network data arriving over the same network paths 180, selecting one of the network paths 180 as a source of data to be provided to the server component 132s. In some examples, the link bonding client 140c and the link bonding service 140s operate at the data link layer (layer 2) of the OSI (Open Systems Interconnection) model, but this is not required. Although the micro-VPN client component 132c and link bonding client component 140c are shown herein as software libraries, they may alternatively be implemented at least in part using hardware and/or firmware. Also, one should appreciate that the micro-VPN client and server and link bonding client and service are merely illustrative and are not intended to be limiting.

In an example, the application program 132 is a SaaS application. The client component 132c may be a web browser or other client-side program that runs web pages and/or other content downloaded from the server component 132s. In an example, the application program 132 is a workspace framework, i.e., a software environment that provides user access to multiple sub-applications from a single interface. Such sub-applications run within the workspace framework, with incoming and outgoing data of those sub-applications passing through the tunnel 134 via the link bonding component 140c. According to some examples, the tunnel 134 applies to all application traffic to and from the application framework.

In example operation, user 102 of the client device 110 launches the client component 132c, e.g., by clicking or tapping a shortcut or by navigating in a browser. Based on previously-established associations 114, the client component 132c connects over the network 170 to the server component 132s and the tunnel 134 is established by action of the micro-VPN client 134c and the micro-VPN server 134s. The link bonding client 140c and the link bonding service 140s may then exchange messages 148 through the tunnel 134. The link bonding client 140c uses the messages 148 as a basis for measuring network performance over the paths 180. For example, sensor 144 measures network speed, e.g., as round-trip delay (using a ping utility), bandwidth, or the like. In an example, sensor 144 separately measures network speed or bandwidth over each of the paths 180 and may repeat its measurements more or less continuously, or at regular intervals, such as once every 50 ms (milliseconds). Although messages 148 are shown as a dotted line that directly connects the link bonding client 140c and server 140s, such messages in actuality pass through the network 170, e.g., via client and server-side drivers 160, and through any supporting infrastructure for each path 180 (e.g., cell phone towers, routers, Internet service providers, and so forth). In this manner, sensor 144 obtains real-time measurements of each path 180. In some examples, the sensor 144 identifies a selected path 144a, i.e., one of the paths 180 that provides the highest speed, bandwidth, consistency, economy, and/or the like, and alerts the link bonding service 140s on the server 120 of the identity of the selected path 144a, e.g., in an indicator, sent over the network 170, that identifies the selected path 144a.

As the user 102 operates the GUI 118 to control the application 132, the client 110 sends application data 162 to the network 170 over all paths 180, at substantially the same time and in parallel. For example, the link bonding client 140c passes the outgoing application data 162 to the TCP/IP driver 150c. The TCP/IP driver 150c uses multi-path routing to forward the application data to the Ethernet driver 160a, the Wi-Fi driver 160b, and the cellular data driver 160c. The client device 110 then sends out the packets 162a, 162b, and 162c via the Ethernet port, the Wi-Fi antenna, and the cell phone antenna. Packets 162a, 162b, and 162c all convey the same data 162 and pass through the network 170 in parallel and at the same time, or nearly so, with any differences among them deriving from differing delays along the paths 180. In an example, all application data 162 sent through all paths passes through the tunnel 134.

At the server 120, packets 162a, 162b, and 162c arrive at driver 160a and pass to the TCP/IP driver 150s and then to the link bonding service 140s. The link bonding service 140s, having obtained the identity of the selected path 144a based on the indicator sent from the client device 110, proceeds to discard all packets arriving over all of the other paths. For example, if the Ethernet path 180a was established as the selected path 144a, then the link bonding service 140s would discard all packets 162b and 162c, allowing only packets 162a to pass to the server component 132s. One should appreciate that the server 120 receives packets 162 via all paths 180, even if the server 120 includes only an Ethernet connection, as the packets 162 originate from different sources and travel through different paths 180 on their way to the server 120.

As shown at the bottom of FIG. 1, a packet 164, which is intended to be representative of all packets, includes a sequence identifier 164a and a payload 164b. The sequence identifier 164a is unique to each packet, but duplicates of the same packet having the same sequence identifier 164a may be sent over different paths 180. In one example, the link bonding service 140s discards arriving packets based on matching of sequence identifiers 164a. For example, the link bonding service 140s maintains a list of sequence identifiers 164a of all recently received packets and discards redundant packets having the same sequence identifiers 164a as those already on the list. The link bonding service 140s may use other approaches for distinguishing packets. For example, particular port designations or other designators in the packet may identify the path 180 over which the packet was transmitted. In such cases, the link bonding service 140s may discard packets whose port designations or other designators do not match that of the selected path 144a.

When the server 120 sends application data 162 to the client device 110, the link bonding service 140s passes the application data to the TCP/IP driver 150s and through the Ethernet driver 160d to the network 170. The server 120 sends the same application data redundantly in packets directed to all paths 180, such that the same packets arrive at the client device 110 via all of the paths 180 in parallel. The server 120 thus sends packets via all paths 180, even though the server 120 may connect to the network 170 using Ethernet only.

Drivers 160a, 160b, and 160c on the client device 110 receive the packets 162 and pass them to the TCP/IP driver 150c, which passes them to the link bonding client 140c. A selector 142 in the link bonding client 140c assigns the selected path 144a as the source of packets from the server component 132s. The selector discards packets 162d from all paths not designated as the selected path 144a, and passes the packets from the selected path 144a to the client component 132c. In an example, the selector 142 identifies packets arriving over the selected path 144a using the same techniques described above in connection with the server.

In an example, the sensor 144 continuously or repeatedly monitors network speed over the paths 180. If another path performs better than the current selected path 144a, e.g., in terms of speed, economy, etc., then the link bonding client 140c may select the better-performing path as a new selected path 144a and communicate the new selected path 144a to the link bonding service 140s. In a particular example, only Wi-Fi and LTE paths are available. The link bonding service 140s may then select Wi-Fi by default. If Wi-Fi speed falls below a designated threshold 146, the link bonding client 140c may choose LTE as the new selected path 144a. In some examples, the link bonding client 140c only switches to LTE when the current Wi-Fi speed drops below the current LTE speed. If Wi-Fi speed later recovers, the link bonding client 140c may reassign the selected path 144a to Wi-Fi. The assignment of selected path 144a is consequential in that it determines which packets are passed to the client component 132c and which packets are discarded. It may also determine which packets the link bonding service 140s on the server 120 passes to the server component 132s and which packets it discards. In an example, the assignment of the selected path 144a does not affect outgoing data transmitted by the client 110 or the server 120, however, as transmission is conducted over all paths 180 in parallel, regardless of the current selected path 144a.

With the arrangement as described, the client device 110 monitors speed of the paths 180 and selects the selected path 144a at any given time. If Wi-Fi suddenly becomes weak, e.g., because the user 102 has moved into a Wi-Fi dead spot, operation seamlessly and transparently switches to LTE (or to some other path). When the user 102 comes back into an active Wi-Fi area, operation seamlessly and transparently switches back to Wi-Fi. The user 102 need never know that the switching has occurred and typically experiences no disruption in service.

In some examples, the client 110 may save power and/or cost by temporarily shutting down the cellular data connection. For example, if Wi-Fi signal strength and/or speed as measured by sensor 144 are consistently high, the client 110 may temporarily close the LTE connection and proceed with Wi-Fi-only communications. Speed testing by sensor 144 may continue, however, and if Wi-Fi speed or signal strength starts to decline, the client 110 may reestablish the LTE connection. Preferably, the client 110 reconnects via LTE before the Wi-Fi signal becomes unusable, such that switching from Wi-Fi to LTE can proceed seamlessly prior to complete loss of the Wi-Fi signal. In some examples, the GUI 118 includes a control that allows the user 102 to turn off an undesired path. For example, if the user 102 is in an area with a strong Wi-Fi signal and does not intend to move during the course of a session, the user 102 might operate the GUI 118 to turn off LTE, thereby reducing power consumption associated with LTE processing and possibly reducing costs, which may be based on minutes used.

One should appreciate that the choice of selected path 144a may be based on a variety of factors. These may include, for example, speed, bandwidth, round-trip time, variability in network strength, interference (e.g., as measured based on numbers of dropped packets), and cost. Such factors may be combined in any suitable way, such as using combinatorial logic, weighted sums, fuzzy logic, machine learning, neural nets, and the like. Although the selected path 144a may be the fastest path in many cases, this is not required. For example, a slower path that is still fast enough to provide good user experience might be chosen as the selected path 144a if it is inexpensive to use and/or has other advantages.

Although a main operating mode of embodiments hereof is to keep multiple network paths active at the same time, such embodiments are not required to work this way all the time. For example, if a network path, such as Wi-Fi, is found to provide a consistently strong signal and is free to use, Wi-Fi may be chosen as the selected path 144a and operation over other network paths may be shut down. In a like manner, network paths that require high power consumption may be shut down temporarily to conserve battery life of the client device 110. Any paths 180 that have been shut down may be revived if the sensor 144 detects a drop in performance of the selected path 144a.

Further, although a single selected path 144a has been described, some embodiments allow for multiple selected paths, such as one for download to the client device 110 and another for download to the server 120. Accordingly, the selector 142 in the client device 110 chooses the selected path for the client device, whereas a similar selector (not shown) in the server 120 chooses the selected path for the server 120. Allowing selected paths to differ for client and server reflects differences in upload versus download performance, which is common to many types of network paths. In these circumstances, measurements used as a basis for choosing the selected paths may be based on unidirectional delays rather than on round-trip delays. According to some variants, a separate computer or other facility may monitor network speed or bandwidth on behalf of the client device 110 and/or server 120.

Figure 2:
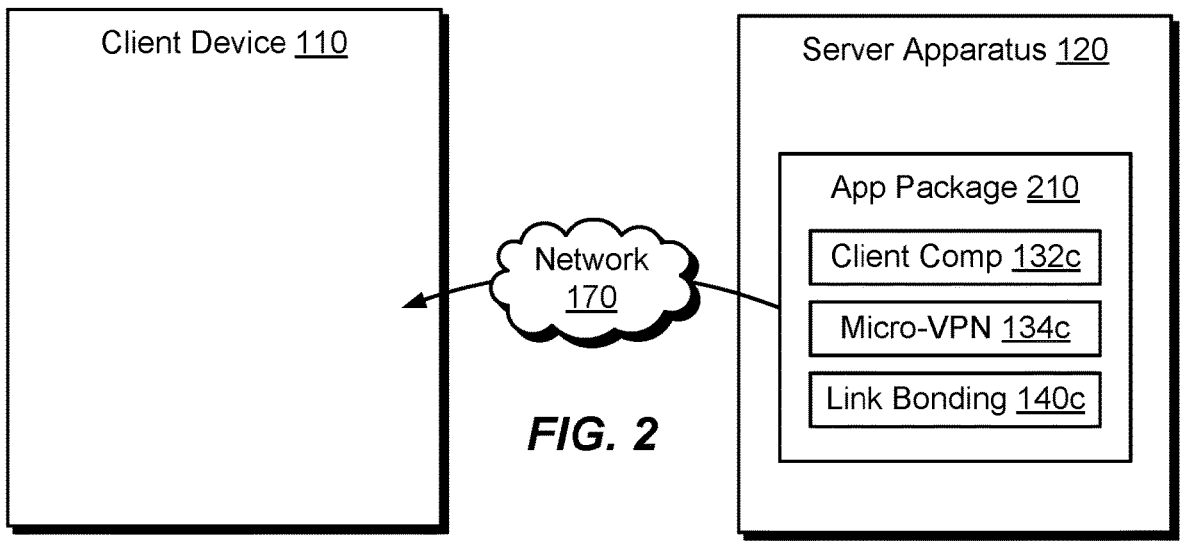
FIG. 2 is a block diagram showing an example arrangement for downloading a SaaS (Software as a Service) application from a server to a client.

FIG. 2 shows an example arrangement for installing an application program on the client device 110. Here, the server 120 stores a downloadable application package 210, which may be provided, for example, as a compressed archive, and which includes code for implementing the client component 132c, the micro-VPN client 134c, and the link bonding client 140c. To install the application program 132, the client device 110 contacts the server 120, e.g., via a website, and downloads the application package 210 to the client device 110 over the network 170. The client device 110 then opens the application package 210, decompresses any compressed contents, and installs the components. As all three components 132c, 134c, and 140c are provided together in a single package 210, the client device 110 is able to install all necessary components for supporting encrypted, multipath operation of the application program 132 via a single download.

Figure 3:
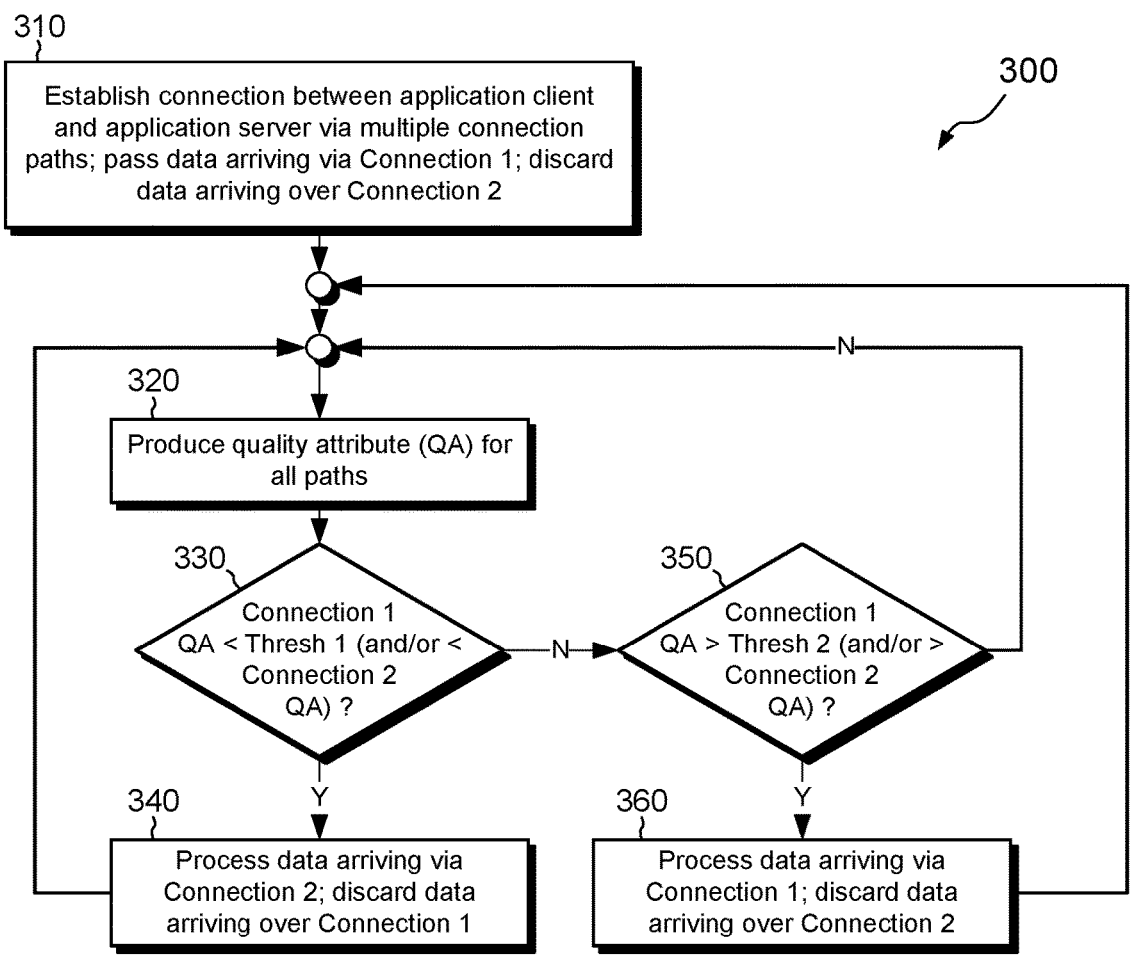
FIG. 3 is a flowchart showing an example method for operating a client and/or server in the environment of FIG. 1.

FIG. 3 shows an example method 300 for seamlessly and transparently switching between two connection paths, such as Wi-Fi and LTE, based on a quality attribute, which may itself be based on speed, bandwidth, network consistency, and/or cost; i.e., any of the factors described above for choosing the selected path 144a. Although the method 300 focuses on two connection paths 180, the method 300 may be extended to any number of such paths. Also, although the depicted acts are shown in a particular order, the order may be varied and some acts may be performed simultaneously.

At 310, a communication session is established between the application client 132c and the application server 132s, e.g., as a result of the user 102 launching the client component 132c. In an example, the communication session takes place via the tunnel 134 established between the micro-VPN client 134c and the micro-VPN server 134s. A respective network connection is configured via each connection path 180, and all communications between the client component 132c and the server component 132s pass through the tunnel 134, for all paths 180. The link bonding client 140c identifies a currently selected path 144a and proceeds to pass data (e.g., packets) that arrive via that selected path 144a to the client component 132c. Thus, the link bonding client 140c uses the selected path 144a as its sole source for all incoming application data 162 and discards data 162 arriving via the other paths. In an example, prior to the sensor 144 making any network measurements, the link bonding service 140c defaults to Wi-Fi as the initial selected path 144a, switching to another path only if no Wi-Fi signal is detected.

At 320, the sensor 144 in the link bonding client 140c measures the connections over all paths 180, e.g., by using ping commands, bandwidth measurements, and/or other approaches, and produces a quality attribute (QA) for each connection path 180. In some examples, the quality attribute is based solely on speed of the respective path. In other examples, the quality attribute is based on any combination of factors, which may include speed, bandwidth, cost, and/or consistency, for example.

At 330, the link bonding client 140c determines whether the quality attribute of the Wi-Fi path (Connection 1) has fallen below a threshold 146 (Thresh 1). The threshold may be predetermined or dynamically established, for example. The link bonding client 140c may also determine whether the quality attribute of Wi-Fi is less than that of LTE (Connection 2). The link bonding client 140c may apply these determinations in the alternative or in any combination.

If the quality attribute of Wi-Fi has fallen below Thresh 1 and/or below that of LTE, then operation proceeds to 340, whereupon the link bonding client 140c proceeds to process data arriving via LTE, discarding any data arriving via Wi-Fi. The link bonding client 140c may communicate this change in an attribute sent to the link bonding service 140s, which may also process arriving data via the LTE path, discarding data arriving via Wi-Fi. Operation then returns to 320, whereupon production of quality attributes and determinations are repeated.

At 330, if the quality attribute for Wi-Fi has not fallen below Thresh 1 and/or below that of LTE, then operation proceeds instead to 350, whereupon the link bonding client 140c determines whether the quality attribute of the Wi-Fi path (Connection 1) exceeds a second threshold (Thresh 2, which is preferably slightly higher than Thresh 1) and/or exceeds the quality attribute of LTE. If not, operation returns to 320; otherwise, operation proceeds to 360, whereupon the link bonding client 140c proceeds to process data arriving via Wi-Fi, discarding any data arriving via LTE. As before, the link bonding client 140c may communicate this change to the link bonding server 140s, which may also process data arriving via the Wi-Fi path, discarding data arriving via LTE. Operation then returns to 320, where the above-described acts are repeated. Thresh 2 may be predetermined or dynamically established, for example.

Operation may proceed in this fashion indefinitely, as long as the application program 132 continues to run. A rationale for making Thresh 2 slightly higher than Thresh 1 is to prevent operation from chattering between sources when quality attributes are close to Thresh 1. If this is not a concern, then Thresh 2 may simply be set to Thresh 1 (i.e., the same threshold may be used for both). One should appreciate that Thresh 1 and Thresh 2 may be established in any suitable way. For example, Thresh 1 and Thresh 2 may be established dynamically based on user activity and/or the nature of the application 132. For instance, the thresholds may be set to lower values if the application 132 exchanges relatively little data, such that a lower level of network performance does not impair user experience. Conversely, the thresholds may be set to higher values if more bandwidth-intensive applications are being run.

FIGS. 4a-4d show various screenshots 118a-118d, which represent portions of the GUI 118 as rendered by the client component 132s of the application program 132, and as viewed on the display 116 of the client device 110. One may recognize the layout of the depicted GUIs as that of a common smartphone app; however, the GUIs 118a-118d are not limited to smartphone applications. For instance, screenshots 118a-118d may be displayed on a laptop computer or on any other computing device. The laptop may have a Wi-Fi connection and may be tethered, via Bluetooth, to a smart phone that has an LTE connection (tethering is an ability of many smart phones to share data via a PAN—Personal Area Network).

Figure 4A:
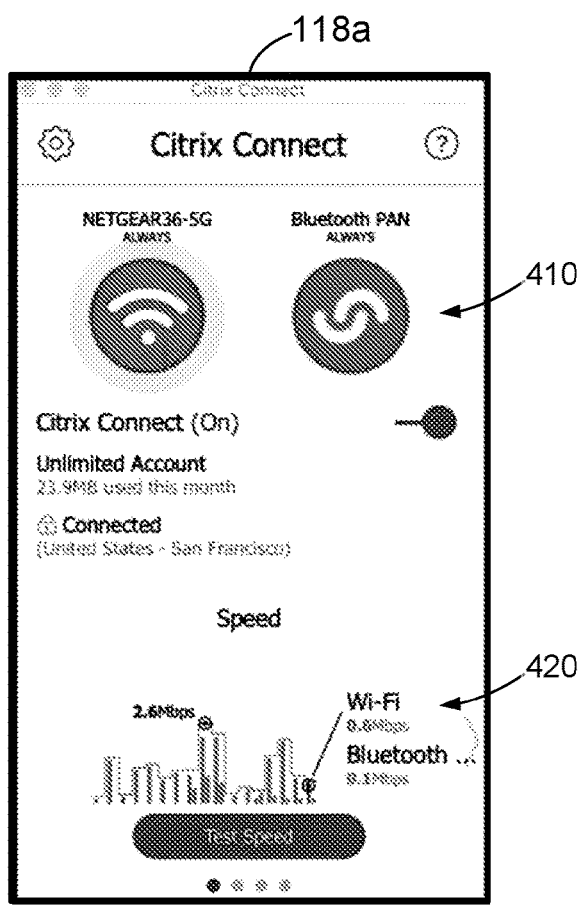
FIGS. 4a-4d are simulated screenshots of a graphical user interface (GUI) of a client application component.

As shown in FIG. 4a, the GUI 118a displays icons 410 for currently active connection paths 180. Icons 410 for Wi-Fi and Bluetooth PAN are specifically shown, indicating that the client device 110 is connected to the Internet via both Wi-Fi and LTE (LTE connection is achieved via the Bluetooth-tethered smart phone). The GUI 118 displays a speed indicator 420, which shows network speed (in megabits per second) for both paths (0.6 Mbps for Wi-Fi and 0.1 Mbps for LTE), e.g., as measured by the sensor 144 in the link bonding client 140c.

Figure 4B:
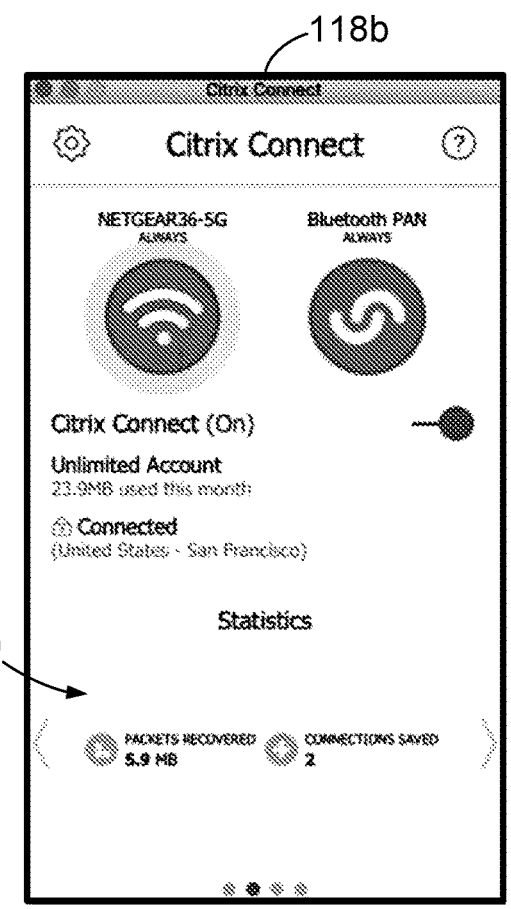
Figure 4C:
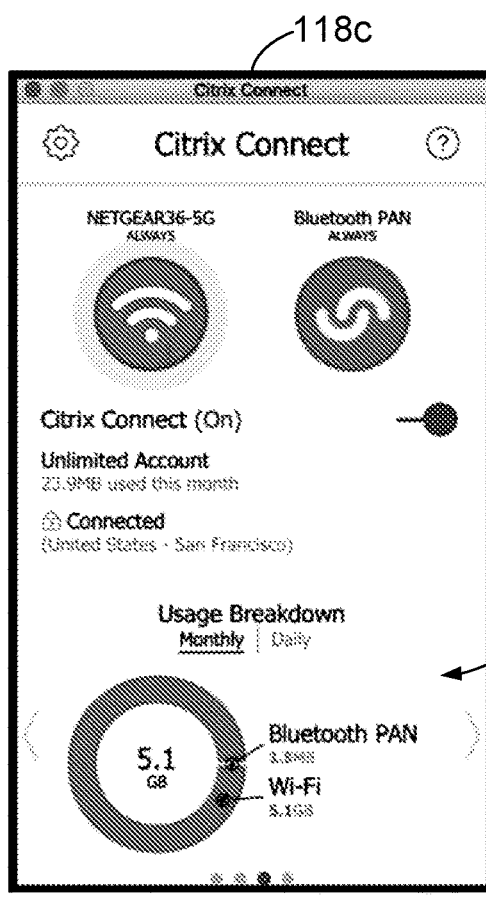
Figure 4D:
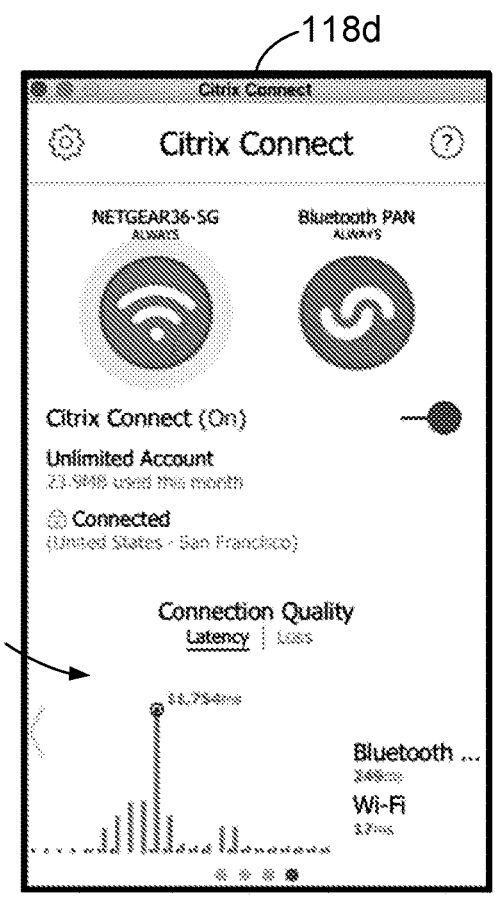

FIGS. 4b-4d show additional information, including, in FIG. 4b, statistics 430 for packets recovered (5.9 MB, the number of packets recovered by switching paths) and connections saved (2; the number of times a lost connection was avoided by switching paths). FIG. 4c shows a usage breakdown 440 (how much data from each path has been used), and FIG. 4d shows connection quality 450, in terms of both latency and loss. In some embodiments, FIGS. 4a-4d represents portions of a larger GUI 118.

Figure 5:
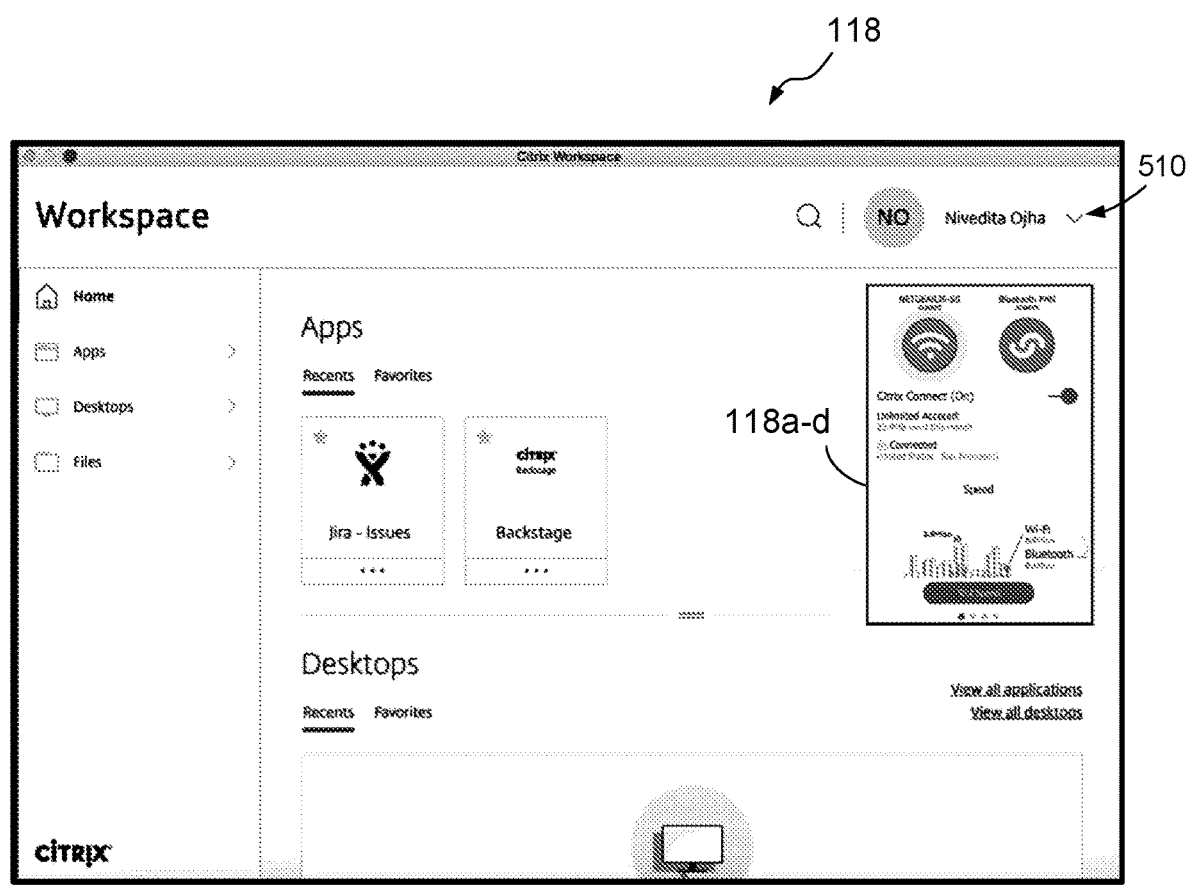
FIG. 5 is a simulated screenshot of a GUI of a SaaS workspace application.

FIG. 5 shows an example of such embodiments, in which an overall GUI 118 includes the above-described GUI portions 118a-118d. For example, user 102 may invoke the GUI portions 118a-118d by clicking an arrow 510 on the overall GUI 118. The overall GUI 118 provides a user interface for the application program 132, which in this example is a workspace framework application. The workspace framework application runs as a SaaS application, e.g., in a web browser or other container, and enables the user 102 to select and run any of its registered sub-applications. The registered sub-applications all run within the context of the application program 132, such that they all communicate via the micro-VPN client 134c and the link bonding client 140c. The depicted arrangement thus uniquely supports operation of a SaaS application over a micro-VPN using multiple paths 180, which are seamlessly switched to maintain a quality connection, even in the presence of dead spots.

Figure 6:
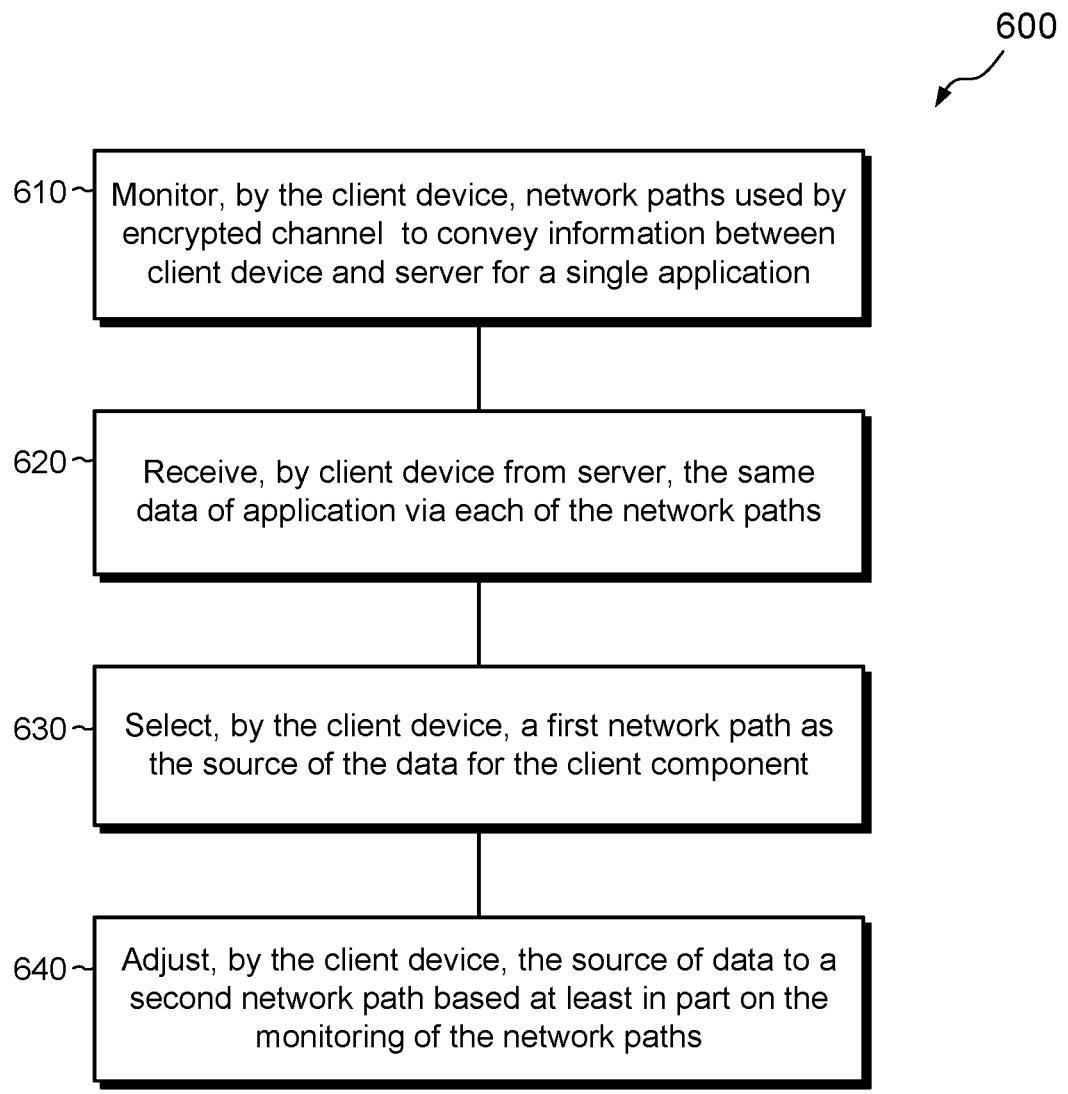
FIGS. 6-8 are flowcharts showing example methods conducted by the client device, by the server, and by a system that includes both the client device and the server.
Figure 7:
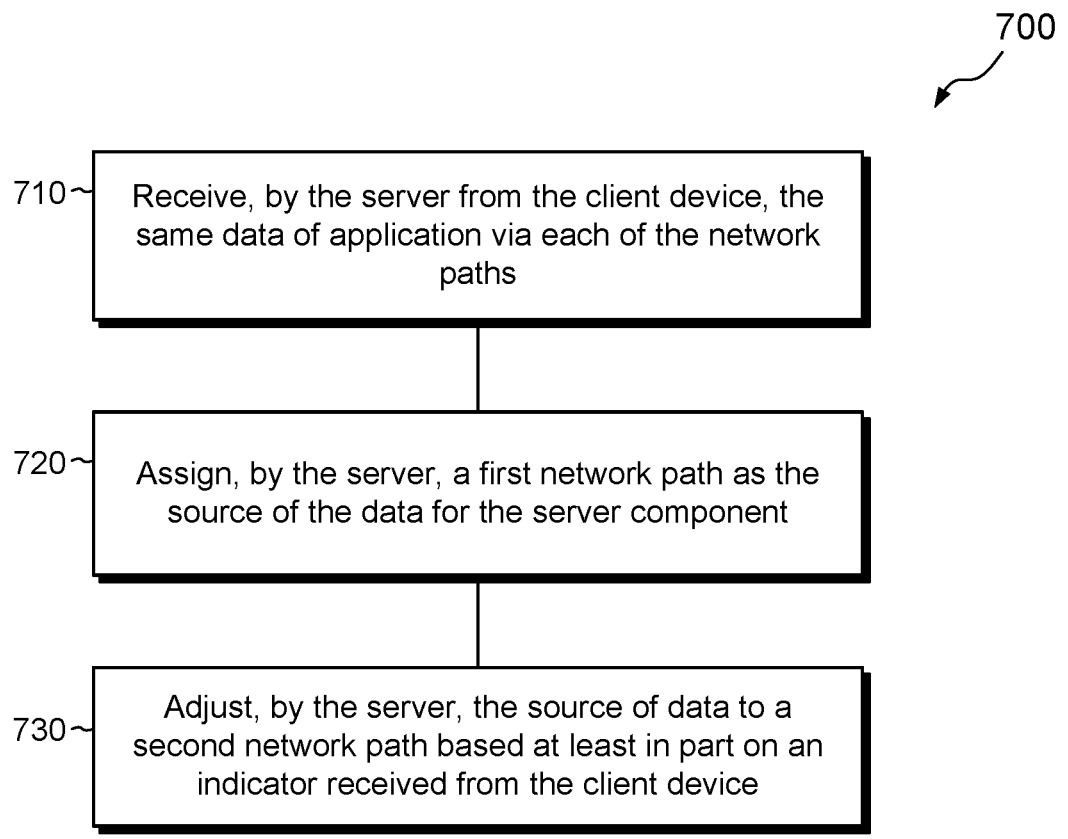
Figure 8:
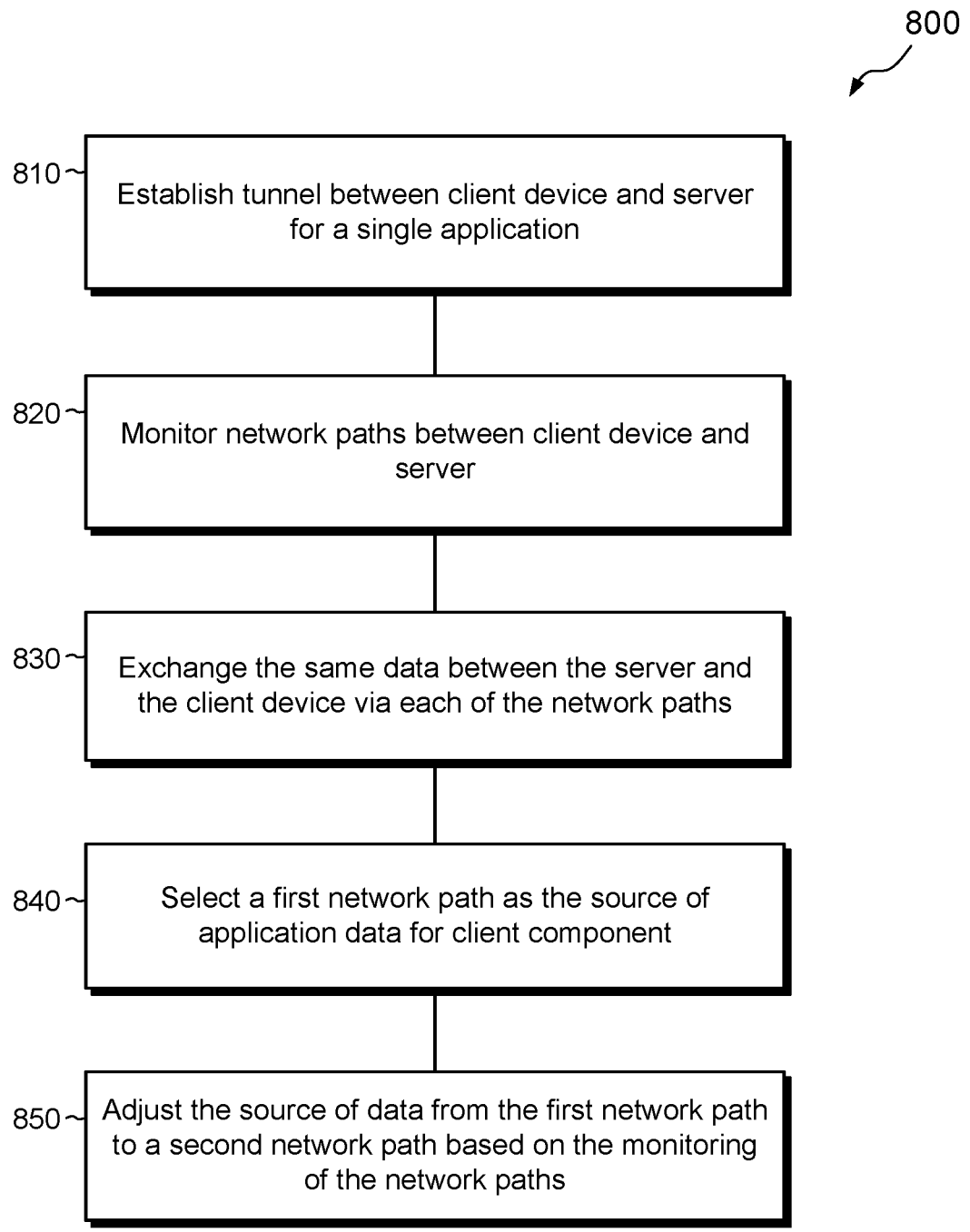

FIGS. 6-8 show example methods 600, 700, and 800 that may be carried out in connection with the environment 100. The method 600 can be performed, for example, by the software constructs described in connection with FIG. 1, which reside in the memory 130c of the client device 110 and are run by the set of processors 114c. The method 700 may be performed, for example, by the software constructs that reside in the memory 130s of the server 120 and are run by the set of processors 114s. The method 800 may be performed by the software constructs that reside in both the client device 110 and the server 120. The various acts of methods 600, 700, and 800 may be ordered in any suitable way. Accordingly, embodiments may be constructed in which acts are performed in orders different from those shown, which may include performing some acts simultaneously.

In FIG. 6, the method 600 may be performed by the client device 110. At act 610, the client device 110 monitors a plurality of network paths 180 used by an encrypted channel 134 configured to convey information between the client device 110 and a server 120 for a single application 132.

At 620, the client device 110 receives data 162 of the single application 132 from the server 120 via each of the plurality of network paths 180. The data 162 received from each of the plurality of network paths is the same data.

At 630, the client device 110 selects a first network path 144a of the plurality of network paths 180 as a source of the data 162 for a client component 132c on the client device 110. For example, the selector 142 in the link bonding client 140c passes packets arriving over the selected path 144a and discards packets arriving over other paths.

At 640, the client device 110 adjusts the source of data for the client component 132c from the first network path to a second network path of the plurality of network paths based at least in part on the monitoring of the plurality of network paths, 180 so as to prevent delay in reception of data caused by a reduction of network continuity of the first network path.

Turning now to FIG. 7, the method 700 may be performed by the server 120. At 710, the server 120 receives application data from the client device 100 over an encrypted channel 134 provided between the server 120 and the client device 110 for a single application 132. The application data 162 is received via a plurality of network paths 180 in parallel, with the plurality of network paths all conveying the same application data.

At 720, the server assigns a first network path of the plurality of network paths 180 as a source of the application data 162 for a server component 132s running on the server 120.

At 730, the server 120 adjusts the source of the application data 162 for the server component 132s from the first network path to a second network path of the plurality of network paths. The adjusting is based at least in part on an indicator received from the client device 110 and acts to prevent delay in reception of data caused by a reduction of network continuity of the first network path.

Turning now to FIG. 8, the method 800 may be performed by both the client device 110 and the server 120. At 810, an encrypted channel 134 is established between the client device 110 and the server 120. The encrypted channel 134 is configured to convey encrypted communications for a single application 132. The encrypted channel 134 may be established under direction of the client device 110, the server 120, or based on coordination between the client device 110 and the server 120.

At 820, a plurality of network paths 180 used by the encrypted channel 134 between the client device 110 and the server 120 are monitored. For example, the client 110, the server 120, and or some separate computer or facility measures network speed, bandwidth, and/or other factors pertaining to each of the plurality of network paths 180.

At 830, the server 120 transmits a set of application data 162 of the single application 132 to the client device 110 over the encrypted channel 134 via each of the plurality of network paths 180. Each of the plurality of network paths 180 conveys the same set of application data 162. When the client device 110 is the one sending the data, the client device 110 transmits a set of application data 162 of the single application 132 to the server 120 over the encrypted channel 134 via each of the plurality of network paths 180, with each of the plurality of network paths 180 conveying the same set of application data 162.

At 840, the client device 110 selects a first network path of the plurality of network paths 180 as a source of application data 162 for the client component 132c running on the client device 110. When the server 120 is the one receiving the data, the server 120 selects a first network path of the plurality of network paths 180 as a source of application data 162 for the server component 132s running on the server 120.

At 840, the client device 110 adjusts the source of data from the first network path to a second network path of the plurality of network paths based at least in part on the monitoring of the plurality of network paths, so as to prevent delay in communicating data between the client device and the server caused by a reduction of network continuity of the first path. When the server 120 is receiving the data, the server 120 adjusts the source of data from the first network path to a second network path of the plurality of network paths based at least in part on the monitoring of the plurality of network paths, so as to prevent delay in communicating data between the server and the client device caused by a reduction of network continuity of the first path.

Figure 9:
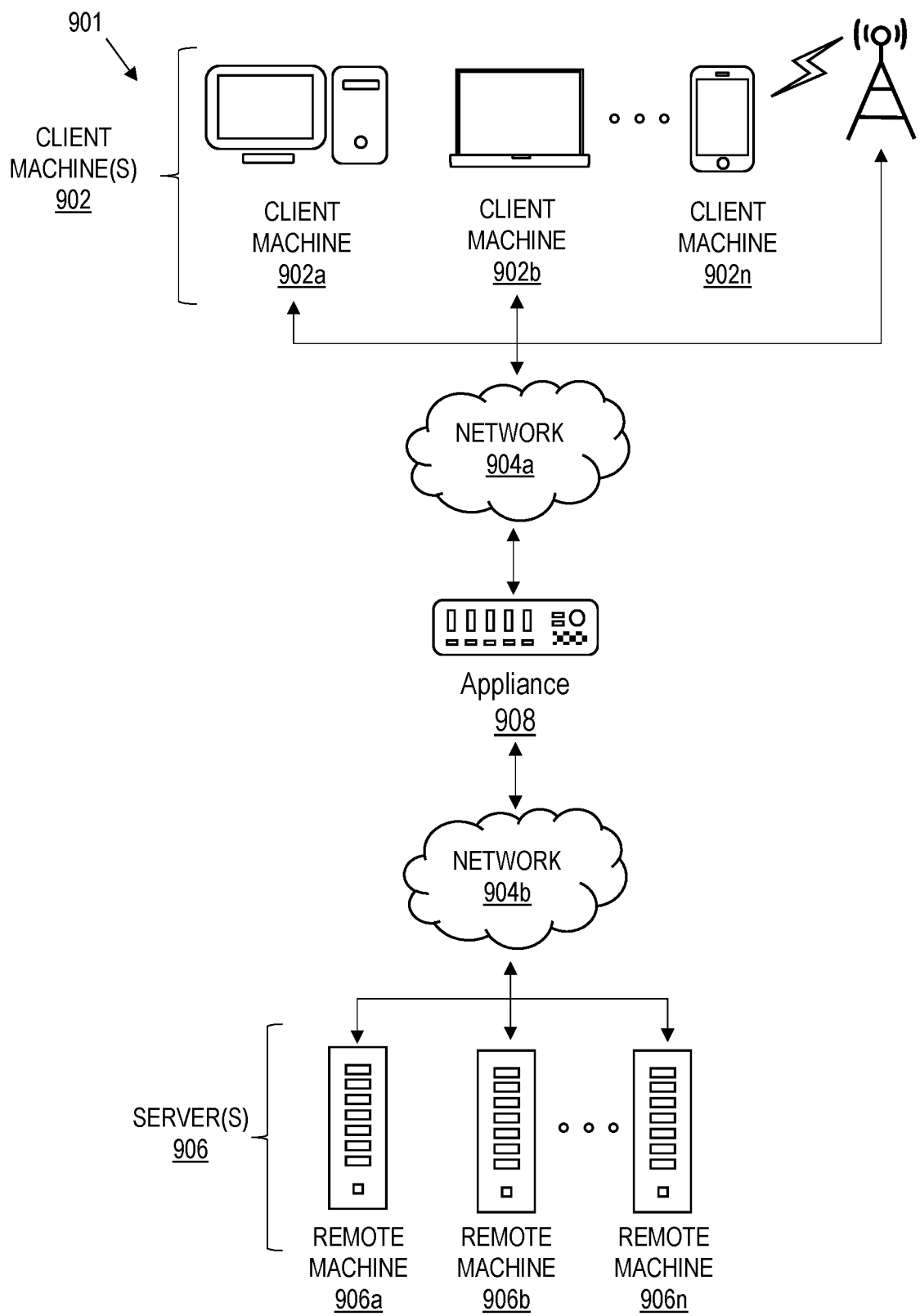
FIG. 9 is a block diagram that shows an example network environment in which various aspects of the disclosure may be implemented.

Referring now to FIG. 9, a non-limiting network environment 901 in which various aspects of the disclosure may be implemented includes one or more client machines 902A-902N, one or more remote machines 906A-906N, one or more networks 904, 904', and one or more appliances 908 installed within the computing environment 901. The client machines 902A-902N communicate with the remote machines 906A-906N via the networks 904, 904'.

In some embodiments, the client machines 902A-902N (which may be similar to client device 110) communicate with the remote machines 906A-906N (which may be similar to server 120) via an intermediary appliance 908. The illustrated appliance 908 is positioned between the networks 904, 904' and may also be referred to as a network interface or gateway. In some embodiments, the appliance 908 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 908 may be used, and the appliance(s) 908 may be deployed as part of the network 904 and/or 904'.

The client machines 902A-902N may be generally referred to as client machines 902, local machines 902, clients 902, client nodes 902, client computers 902, client devices 902, computing devices 902, endpoints 902, or endpoint nodes 902. The remote machines 906A-906N may be generally referred to as servers 906 or a server farm 906. In some embodiments, a client device 902 may have the capacity to function as both a client node seeking access to resources provided by a server 906 and as a server 906 providing access to hosted resources for other client devices 902A-902N. The networks 904, 904' may be generally referred to as a network 904. The networks 904 may be configured in any combination of wired and wireless networks.

A server 906 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 906 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 906 may execute a remote presentation services program or other program that uses a thin-client or a remote-display protocol to capture display output generated by an application executing on a server 906 and transmit the application display output to a client device 902.

In yet other embodiments, a server 906 may execute a virtual machine providing, to a user of a client device 902, access to a computing environment. The client device 902 may be a virtual machine. The virtual machine may be managed by, for example, a hypervisor, a virtual machine manager (VMM), or any other hardware virtualization technique within the server 906.

In some embodiments, the network 904 may be: a local-area network (LAN); a metropolitan area network (MAN); a wide area network (WAN); a primary public network 904; and a primary private network 904. Additional embodiments may include a network 904 of mobile telephone networks that use various protocols to communicate among mobile devices. For short range communications within a wireless local-area network (WLAN), the protocols may include 802.11, Bluetooth, and Near Field Communication (NFC).

Figure 10:
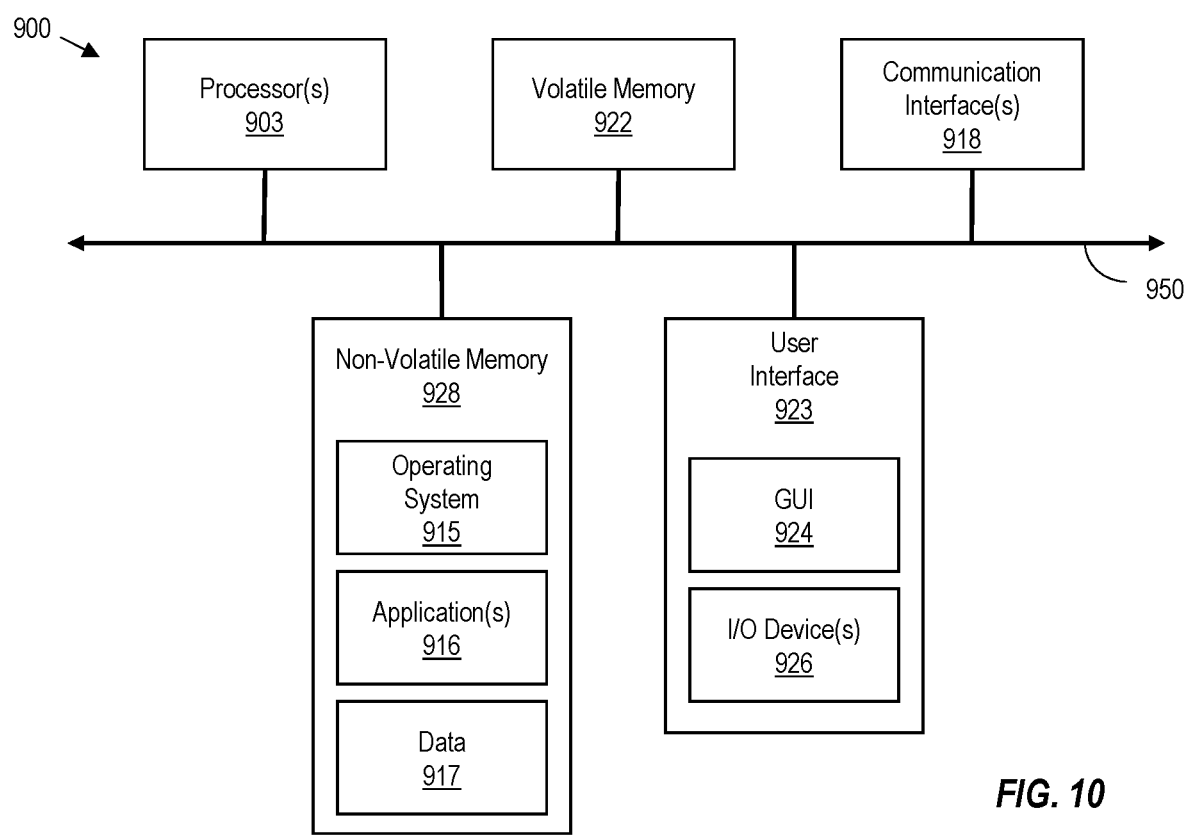
FIG. 10 is a block diagram that shows a computing device useful for practicing an embodiment of client devices, appliances and/or servers.

FIG. 10 depicts a block diagram of a computing device 900 useful for practicing an embodiment of client devices 902, appliances 908 and/or servers 906. The computing device 900 includes one or more processors 903, volatile memory 922 (e.g., random access memory (RAM)), non-volatile memory 928, user interface (UI) 923, one or more communications interfaces 918, and a communications bus 950.

The non-volatile memory 928 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 923 may include a graphical user interface (GUI) 924 (e.g., a touchscreen, a display, etc.) and one or more input/output (I/O) devices 926 (e.g., a mouse, a keyboard, a microphone, one or more speakers, one or more cameras, one or more biometric scanners, one or more environmental sensors, and one or more accelerometers, etc.).

The non-volatile memory 928 stores an operating system 915, one or more applications 916, and data 917 such that, for example, computer instructions of the operating system 915 and/or the applications 916 are executed by processor(s) 903 out of the volatile memory 922. In some embodiments, the volatile memory 922 may include one or more types of RAM and/or a cache memory that may offer a faster response time than a main memory. Data may be entered using an input device of the GUI 924 or received from the I/O device(s) 926. Various elements of the computer 900 may communicate via the communications bus 950.

The illustrated computing device 900 is shown merely as an example client device or server, and may be implemented by any computing or processing environment with any type of machine or set of machines that may have suitable hardware and/or software capable of operating as described herein.

The processor(s) 903 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 903 may be analog, digital or mixed-signal. In some embodiments, the processor 903 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 918 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 900 may execute an application on behalf of a user of a client device. For example, the computing device 900 may execute one or more virtual machines managed by a hypervisor. Each virtual machine may provide an execution session within which applications execute on behalf of a user or a client device, such as a hosted desktop session. The computing device 900 may also execute a terminal services session to provide a hosted desktop environment. The computing device 900 may provide access to a remote computing environment including one or more applications, one or more desktop applications, and one or more desktop sessions in which one or more applications may execute.

A technique has been described for managing communication over a network 170. The technique maintains multiple network paths 180 simultaneously, exchanging the same data 162 redundantly through all network paths 180 and allowing a receiver (e.g., selector 142) to select one of the network paths 180 as its source of data. In the event that a first, currently-selected network path, such as Wi-Fi, becomes weak, the receiver 142 automatically and seamlessly switches its source of data to a second network path, such as LTE, while the first network path remains operational. Given that the second (LTE) network path is already on and is already conveying data, the transition is nearly instantaneous. User experience is greatly improved, as even highly interactive applications running in environments with inconsistent networks can remain fully functional with generally no downtime. Reliability and user experience are thereby enhanced.

The following paragraphs describe example implementations of methods, systems, and computer-readable media in accordance with the present disclosure.

According to some examples, a method includes monitoring, by a client device, a plurality of network paths that convey data between the client device and a server, the data being associated with a single application on the server. The method further includes receiving, by the client device, the data from the server via each of the plurality of network paths, the data received from each of the plurality of network paths being the same. The method still further includes selecting, by the client device, a first network path of the plurality of network paths from which to receive data to enable delivery of the single application on the server to the client device, and adjusting, by the client device, the selected network path from the first network path to a second network path of the plurality of network paths based at least in part on the monitoring of the plurality of network paths, so as to prevent delay in receipt of data from the server caused by a reduction of network continuity of the first network path.

Section II: Extending Management Control to IoT Devices

An improved technique employs a managed device to extend management control by an organization to IoT (Internet of Things) devices in a local environment of the managed device. The managed device discovers any local IoT devices and participates in a communication with a server to bring one or more of the IoT devices under management control. The technique described in this section may be provided in the environment of Section I, e.g., in an arrangement in which the managed device maintains multiple, simultaneous network connections and seamlessly switches between or among them. The Section-I arrangement is not required, however, as the technique presented in this section may be used independently of the one presented in Section I.

Figure 11:
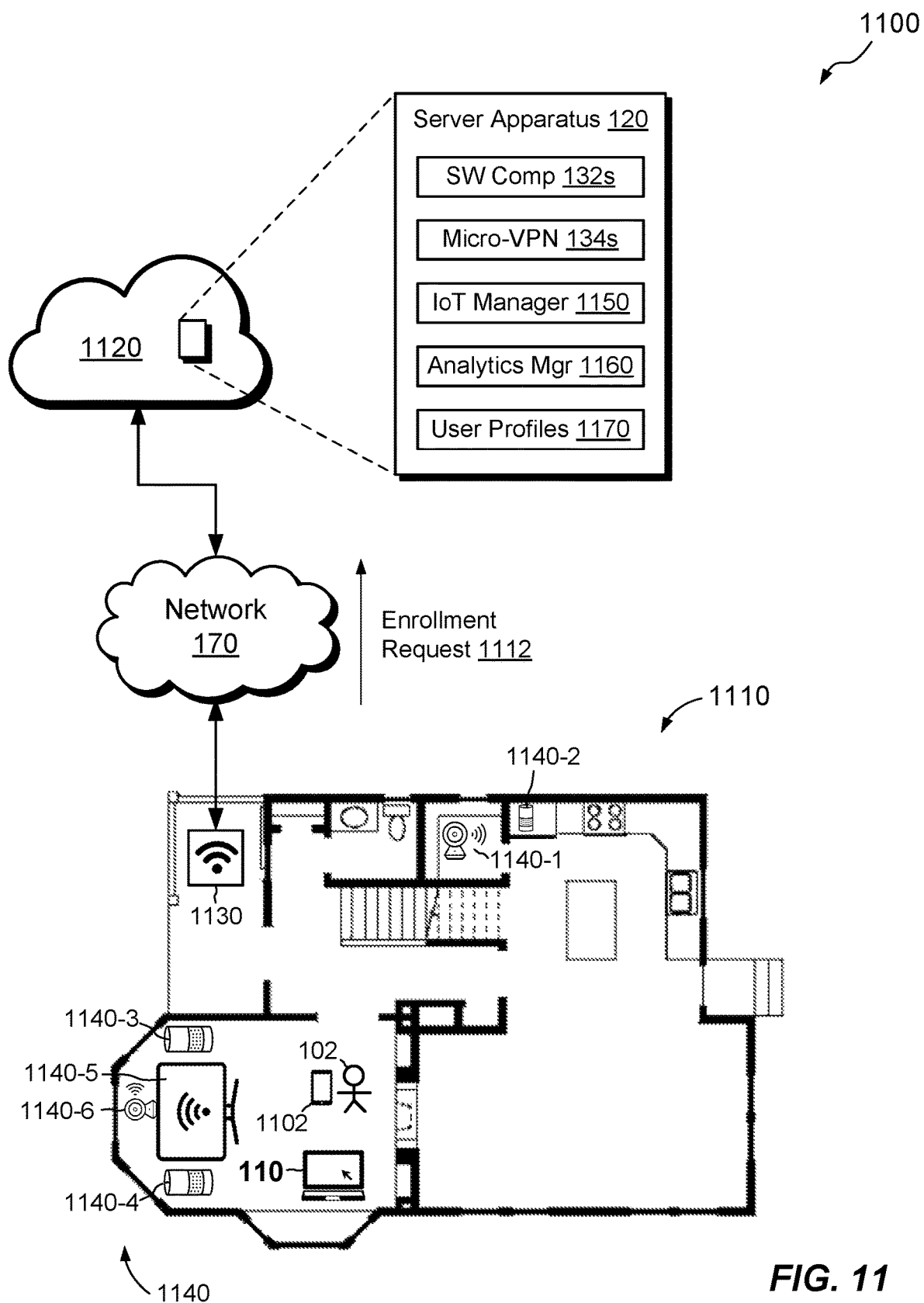
FIG. 11 is a block diagram of an example system in which embodiments can be practiced for extending management control by an organization to IoT devices in a local environment.

FIG. 11 shows an example system 1100 in which embodiments of the improved technique can be practiced. Here, a managed device 110 operates in a local client environment 1110, such as a home of a user 102 or some other environment disposed about the managed device 110, i.e., in a vicinity of the managed device 110, such as within Bluetooth and/or Wi-Fi range. The managed device 110 may be a laptop computer, desktop computer, tablet, or any other smart device, such as any of the types of devices described in connection with the client device 110 in Section I. The managed device 110 may use multiple, simultaneous network connections 180, as described in Section I, and may use a mobile device 1102 (e.g., a smart phone or cellular dongle) to supply a cellular network path for use by the managed device 110, e.g., via tethering or direct connection. This is not required, however, as the managed device 110 need have only a single network path.

The local client environment 1110 includes a base station 1130, such as a Wi-Fi router, which connects to the server 120 over the computer network 170 (FIG. 1). The server 120 and network 170 may be provided in any of the ways described for the server 120 and network 170 of Section I. In the example shown, the server 120 is part of a cloud point-of-presence (PoP) 1120. For example, the cloud PoP 1120 is operated by an organization, such as a company, school, government agency, or other entity, which may deploy numerous cloud PoPs, e.g., in different geographical locations. The "organization" may also be referred to herein as an "entity." Although not shown, the cloud PoP 1120 may include numerous servers and other infrastructure for promoting security, data availability, failover, load balancing, and the like. Although the server 120 is shown as a single computer, one should appreciate that the server 120 may be implemented using any number of physical computers and/or virtual machines.

The local environment 1110 further includes a variety of IoT devices 1140, such as a security camera 1140-1, smart speakers 1140-2, 1140-3, and 1140-4, a smart TV 1140-5, and a webcam 1140-6. These are merely examples of possible IoT devices and are not intended to be limiting. Some of IoT devices 1140 may connect wirelessly to the base station 1130, e.g., over a local Wi-Fi network. Some IoT devices 1140 may connect to the base station 1130 using cables, such as Ethernet cables. Other IoT devices 1140 may support Bluetooth and so not require a connection to the base station 1130, e.g., they may connect point to point to other devices instead.

As in Section I, the server 120 may include a software component 132s and a micro-VPN server component 134s (FIG. 1). Although not required by all embodiments, these components may perform similar activities to those described in Section I. For example, the server component 132s is a server-side component of an application 132 (shown in FIG. 1), which coordinates with a browser or other client-side component on the managed device 110 to provide specified functionality. The application 132 may be delivered as a SaaS (Software as a Service) application or as a web application. In addition, the application 132 may provide an access point for launching multiple other applications or apps, e.g., by providing a virtual workspace environment. The micro-VPN server component 134s coordinates with a micro-VPN client component 134c on the managed device 110 to establish an application-specific VPN, also referred to herein as a micro-VPN or "tunnel" 134 (FIG. 1), for securely exchanging encrypted data between the server component 132s and the client component 132c.

As further shown in FIG. 11, the server 120 may include an IoT manager 1150, an analytics manager 1160, and user profiles 1170. The IoT manager 1150 is configured to enroll selected IoT devices into a management framework of the organization and to manage the IoT devices once they are enrolled. Activities of the IoT manager 1150 may include, for example, scanning IoT devices for malware, updating IoT software and/or firmware, and downloading skills to IoT devices. "Skills" as used herein refer to software features which can be installed on IoT devices to enhance their native functionality. Some vendors may use the term "Actions" or "Apps" to describe similar features, and "skills" is intended to cover all such variants. Skills as used herein include native skills available from the manufacturer and custom skills developed for the organization. For example, a custom skill for a smart speaker might be to respond to voice control by initiating a program, feature, or other resource of the organization. Some manufacturers provide SDKs (Software Development Kits) for enabling third parties to design and deploy custom skills.

The analytics manager 1160 is configured to collect information about users, devices (including IoT devices), usage patterns, and other factors, e.g., for promoting security and/or enhancing other aspects of operation. In an example, the analytics manager 1160 applies Bayesian logic and/or machine learning to make predictions and/or inferences that inform organizational processes of potential threats, opportunities, and/or circumstances, enabling the organization to take actions consistent with historical trends or identified threats.

User profiles 1170 store information about users, such as user 102, e.g., for implementing user-specific activities. The information may include data describing the user's offsite environment (e.g., environment 1110), a managed device (110) operated by the user, and any enrolled IoT devices (1140) in the user's environment.

In example operation, the managed device 110 operates in the local client environment 1110. For example, the user 102 works from home and uses the managed device 110 to remotely access applications, files, or other resources of the organization on the server 120. For instance, the managed device 110 connects to the base station 1130 (e.g., using Ethernet cabling or Wi-Fi) and communicates with the server 120 in the cloud PoP 1120 over the network 170.

The managed device 110 is "managed" in that it operates in whole or in part under management control by the organization. The managed device 110 itself may be owned by the organization and issued to the user 102, or it may be owned by the user 102 or by some other person or entity. The managed device 110 may be wholly managed, meaning that the organization controls the entire device 110, including all of its programs and data, or it may be partially managed, meaning that the organization controls only specified applications and/or features, with other applications and/or features falling outside the organization's control.

While operating in the local client environment 1110, the managed device 110 may perform a discovery operation to discover IoT devices 1140 in the local client environment 1110. The managed device 110 may initiate the discovery operation automatically, e.g., as part of a login sequence or scheduled activity, or it may initiate the discovery operation at a specific request by the user 102, e.g., by the user 102 operating a user interface of the managed device 110. The managed device 110 checks for the presence of IoT devices 1140, e.g., by scanning wired connections to the base station 1130, Wi-Fi connections to a Wi-Fi network created by the base station 1130, and/or Bluetooth connections, which may include direct point-to-point connections.

In an example, the managed device 110 displays a list of discovered IoT devices to the user 102 and prompts the user 102 to select one or more of the listed IoT devices for management control by the organization. In some examples, the list of IoT devices includes fewer than all IoT devices discovered, as the list may be limited to IoT devices that the IoT manager 1150 supports. The user 102 then selects desired IoT device(s) from the list, and the managed device 110 accepts the user selection(s). The managed device 110 then participates in a communication with the server 120 to extend management control by the organization to the selected IoT devices. For example, the managed device 110 sends an enrollment request 1112 to the server 120, specifying one or more selected IoT devices. In response to the enrollment request 1112, the IoT manager 1150 performs various acts to bring specified IoT devices under management control of the organization. These acts may include, for example, coordinating with the managed device 1110 to scan the selected IoT devices for malware, to check whether the selected IoT devices have the most recent software and/or firmware, to install skills onto one or more of the IoT devices, and to install an IoT agent onto the IoT devices, e.g., for facilitating management of the IoT devices. In addition, the server 120 may update a user profile of the user 102 to record data about the newly managed IoT devices. For example, the data may include the make, model, and MAC (Media Access Control) address (or other address) of newly managed IoT devices, its current software and/or firmware version, and any skills installed thereon. It may further include, in some examples, location information within the environment 1110, such as a room identifier (e.g., dining room, upstairs bathroom) or some other indicator of location.

Figure 12:
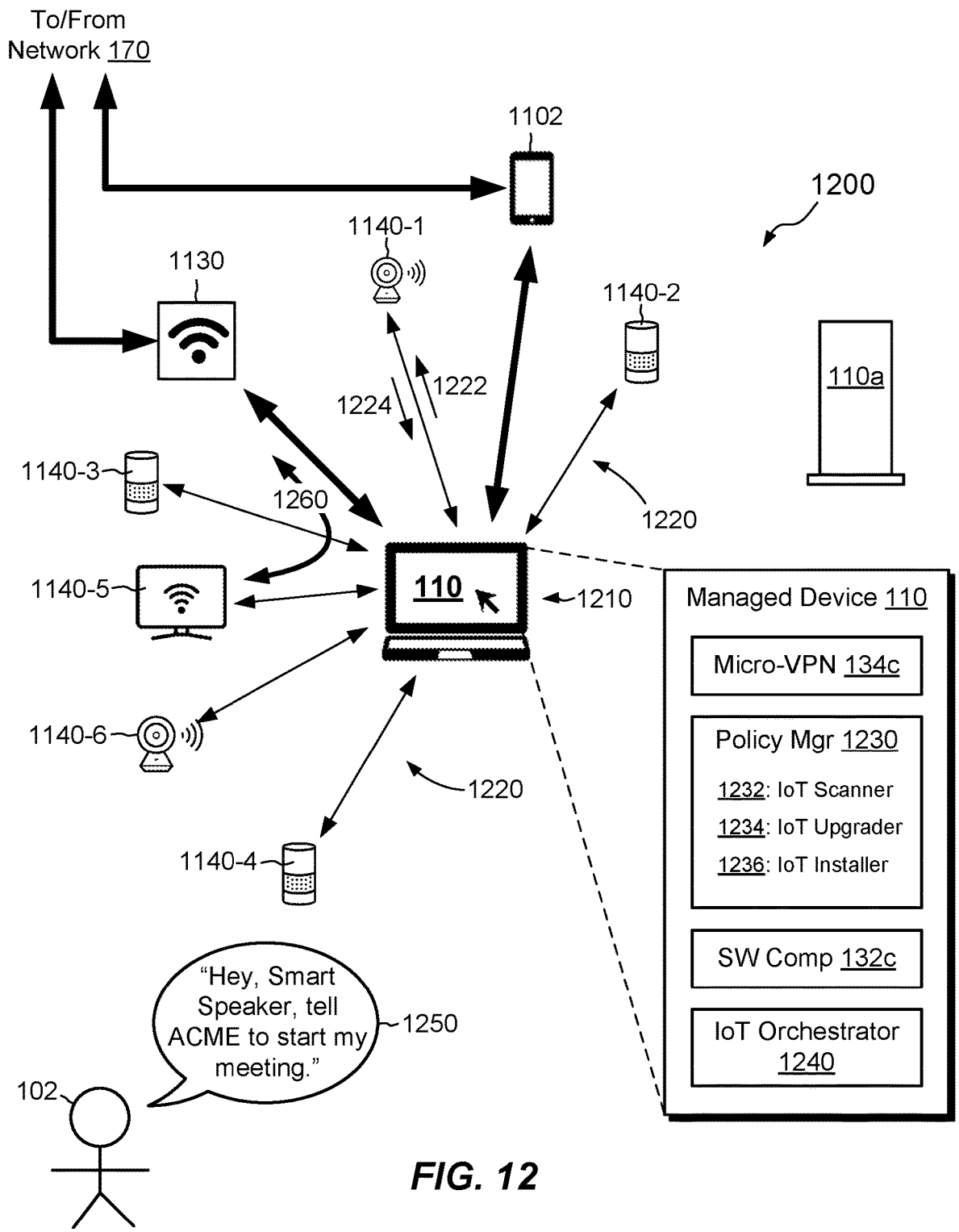
FIG. 12 is a block diagram that shows an example logical network formed among a managed device and multiple IoT devices in the local environment of FIG. 11.

FIG. 12 shows additional example aspects of the arrangement of FIG. 11. Here, the components of FIG. 11 are arranged to illustrate an example logical network 1200. As shown, the logical network 1200 has a hub 1210 formed by the managed device 110 and spokes 1220 that connect the hub 1210 to respective IoT devices 1140. The depicted hub-and-spoke arrangement directs data ingress (input) 1222 to any IoT device 1140 through the managed device 110 and likewise directs any data egress (output) 1224 from any IoT device 1140 to the managed device 110. Instead of the base station 1130 providing a hub for IoT devices, as would normally be the case in conventional systems, the role of hub is transferred to the managed device 110. The managed device 110 is thus in a position to monitor any data ingress or egress to or from the IoT devices 1140 and to enforce management policies of the organization. For example, the managed device 110 may block certain transmissions that the organization prohibits while passing transmissions that are allowed. More generally, the placement of managed device 110 at the hub 1210 of the logical network 1200 enables the managed device 110 to act as a local PoP (Point-of-Presence) for implementing management policies of the organization among the IoT devices 1140 in the local environment 1110.

In an example, the logical network 1200 is established and configured when the managed device 110 enrolls the first IoT device 1140 in the environment 1110. The logical network 1200 may be updated when an IoT device is added or removed, or whenever any other network change is made. The managed device 110 may form the logical network 1200 as an overlay network having routing rules maintained by the managed device 110, base station 1130, and/or IoT devices 1140. It is not normally necessary to change any physical connections of devices to configure the logical network 1200. Rather, the logical network 1200 may be regarded as a software-defined network, which routes all ingress to and egress from the IoT devices 1140 through the managed device 110.

As shown, the logical network 1200 further includes a spoke that connects the managed device 110 to the base station 1130, for enabling communication over the network 170. Optionally, a separate spoke may logically connect the managed device 110 to the mobile device 1102, e.g., via a tethered connection. The mobile device 1102 (or wireless dongle) may then provide a separate and redundant connection to the network 170. In this example, the logical network 1200 thus benefits from multiple network paths 180 (FIG. 1), including the ability to switch seamlessly between or among them, thus achieving the same reliability as the arrangement described in Section I.

Not only does the managed device 110 enforce management policy by acting as a gatekeeper for IoT ingress and egress, it can also in some examples promote security via the micro-VPN. As shown in the enlarged view to the right, the managed device 110 may include the above-described micro-VPN client component 134c, which establishes an application-specific VPN or tunnel 134 with the micro-VPN server component 134s. Any data exchanged between the managed device 110 and the server 120 within the tunnel 134 (shown in FIG. 1) is thus encrypted according to security protocols of the organization, and such encryption also applies to communications between the IoT devices 1140 and the server 120, so that communications funnel through the managed device 110 and through the tunnel 134. IoT traffic is thus protected using the same VPN technology as other application traffic between the managed device 110 and the server 120.

As further shown in the enlarged view to the right, the managed device 110 includes a policy manager 1230, the above-described client-side application component 132c, and an IoT orchestrator 1240. The policy manager 1230 is configured to administer management policies of the organization in the local environment 1110. In an example, the policy manager 1230 includes an IoT scanner 1232 (configured to scan IoT devices 1140 for malicious code and quarantine or eliminate it), an IoT upgrader 1234 (configured to upgrade software and/or firmware on IoT devices 1140), and an IoT installer 1236 (configured to install skills on IoT devices 1140).

The IoT orchestrator 1240 coordinates activities of IoT devices 1140 in the local environment 1110 for addressing particular use cases. To provide a simple example, user 102 may issue a voice command 1250 to smart speaker 1140-4, saying, "Hey Smart Speaker, tell ACME to start my meeting." In response to the voice command 1250, the IoT orchestrator 1240 checks for available IoT devices 1140, e.g., by directly detecting their presence electronically or by querying the user profile 1170 for the user 102 on the server 120. Once in possession of the available IoT devices 1140, the IoT orchestrator 1240 identifies particular ones of the IoT devices 1140 that might be useful in the context of an online meeting, such as the speakers 1140-3 and 1140-4, smart TV 1140-5, and webcam 1140-6. The IoT orchestrator 1240 then prompts the user 102 to confirm that the identified devices may be used. If the user 102 confirms, the IoT orchestrator 1240 connects the speakers 1140-3 and 1140-4, smart TV 1140-5, and webcam 1140-6 to the managed device 110 and enables their use during the online meeting. When the meeting starts, the user 102 can benefit from the video and audio quality of the IoT speakers and IoT TV, and other participants in the meeting can benefit from the quality of the IoT webcam.

One should appreciate that commercial smart speakers do not generally understand a voice command like, "Hey Smart Speaker, tell ACME to start my meeting." For this purpose, the smart speaker 1140-4 may be equipped with a custom skill. The skill recognizes the word "ACME" and directs the command to an ACME server, which interprets the command and takes appropriate action. If ACME is the organization managing the managed device 110 and IoT devices 1140, then the server 120 may be ACME's server and the custom skill may be configured to access any resource available on or by the server 120. For example, the skill may access the corporate calendar of the user 102, check for a meeting around the current time, obtain the meeting parameters, and direct the managed device 110 to launch the meeting with the specified parameters in a meeting application. If the user approves, the meeting may proceed using the smart speakers, smart TV, and smart webcam. In this manner, the IoT orchestrator 1240 can stitch together available IoT devices 1140 and enable their use in responding to voice commands. The IoT orchestrator 1240 is not limited to voice commands but rather may respond to commands arriving from any source and/or in response to any events or scheduled activities.

One should appreciate that the smart speaker 1140-4 may not be capable of transcribing speech on its own but may rather use a cloud service for this purpose. For example, Amazon Alexa may use Amazon servers to transcribe speech. Even with this arrangement, network traffic between the smart speaker 1140-4 and the Amazon servers passes through the managed device 110, i.e., along the pathways defined by the logical network 1200.

Many orchestrated use cases are contemplated, and some may involve the analytics manager 1160 on the server 120. For example, a security application may activate the security camera 1140-1 in the local environment 1110. The security camera 1140-1 may obtain video of the user 102 and provide the video to the server 120. The server 120 may perform facial recognition on the video images and determine that an analyzed face it that of the user 102. If around the same time the video is acquired a login attempt is made with the credentials of the user from a distant location, the analytics manager 1160 may flag an inconsistency and cause the server 120 to deny the login request or to require strong authentication.

In some examples, the managed device 110 may perform a secure handoff of certain network traffic. For example, it may be inefficient and unnecessary for the managed device 110 to remain in the direct path of the smart TV 1140-5 when it receives 4-K video, or to remain in the direct path of the webcam 1140-6 when it transmits similar video. Thus, in accordance with certain improvements, the managed device 110 allows an IoT device 1140 to communicate directly over the network 170 without being in the direct path. The managed device 110 may achieve this end by first establishing a secure connection between an IoT device and an endpoint on the network 170. As shown by arrow 1260, the IoT device may then communicate directly with the endpoint over the secure connection, without direct involvement of the managed device 110.

Although management policies of the organization may constrain communications of managed IoT devices over the network 170, one should appreciate that the organization is generally not the owner of the IoT devices or other equipment in the client environment 1110. The user 102 may sometimes need to operate the IoT devices 1140 for personal use, outside the management of the organization, and the IoT devices 1140 should preferably accommodate. To this end, certain examples allow users to release an IoT device 1140 from the organization's control. For example, a user may operate a configuration manager (not shown) on the managed device 1110 to release an IoT device and restore that device to its unmanaged state. Any custom skills installed on the IoT device may be removed or deactivated. The IoT device may no longer be a part of the logical network 1200 and no longer has its traffic routed through the managed device 110 and server 120. If the user 102 later wishes to bring the IoT device back under the organization's management, the user 102 need only add the IoT device as described above, e.g., by scanning the environment 1110 for available devices and selecting the previously-released IoT device for management.

In some examples, the client environment 1110 may include a backup device 110*a*, which may perform the role of the managed device 110 when the managed device 110 is missing or turned off. The backup device 110*a* may be another computer, an SD-WAN appliance, a tablet, a smart phone, a network device, or any device capable of connecting to the IoT devices 1140 and running software. Indeed, the managed device 110 may itself be implemented in any of these ways.

Figure 13:
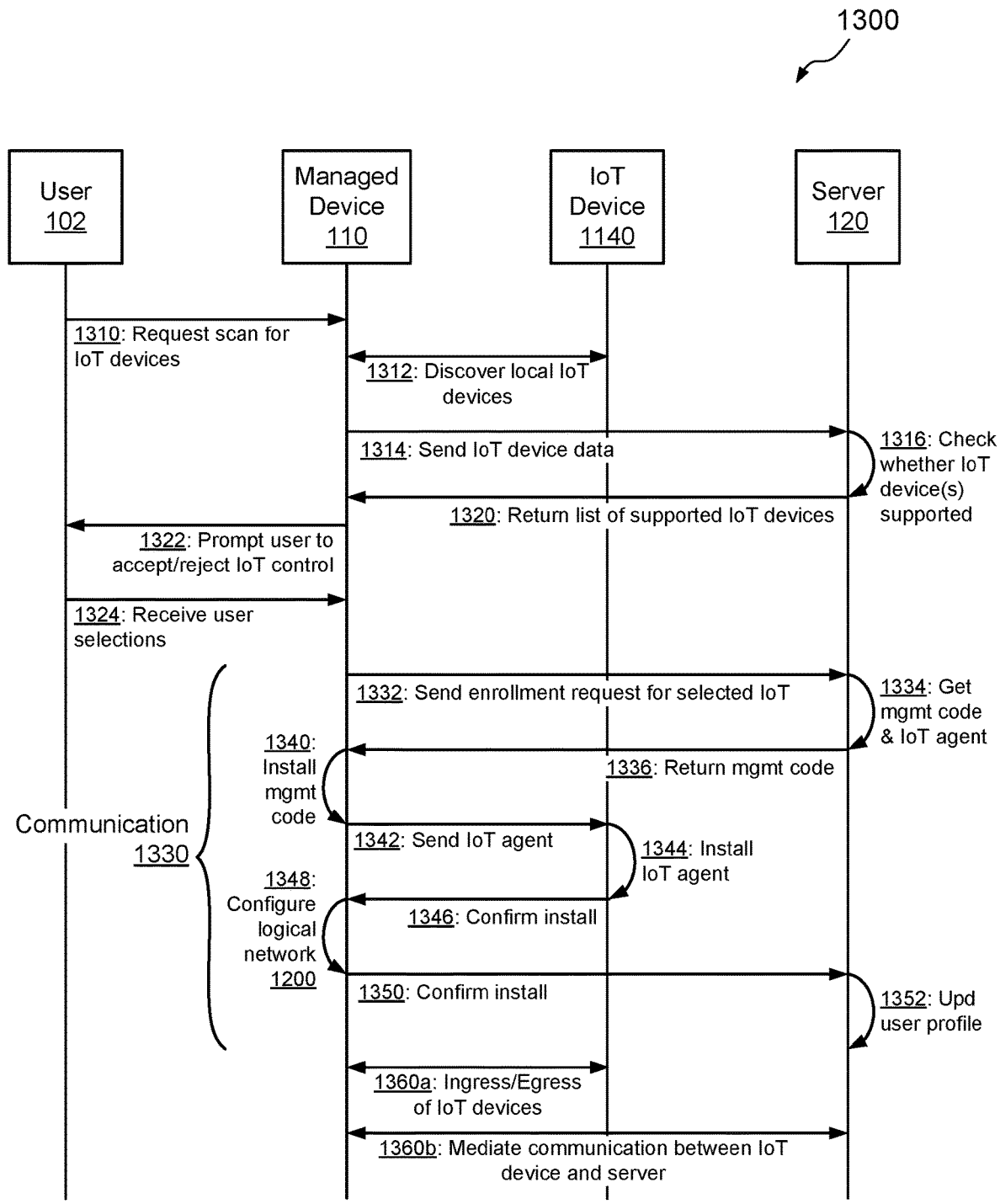
FIG. 13 is a sequence diagram showing example communications involved with extending management control to IoT devices.

FIG. 13 shows an example arrangement 1300 for extending organizational management to include IoT devices in a local client environment 1110. The illustrated arrangement may involve activity among the user 102, the managed device 110, one or more IoT devices 1140, and the server 120.

Operation may begin at 1310, whereupon the user 102 issues a request to scan the local environment 1110 for IoT devices 1140. For example, the user 102 may operate a user interface of the managed device 110 to initiate this function.

At 1312, the managed device 110, having received the request, performs a discovery operation to search the local environment 1110 for available IoT devices 1140. Discovery may include, for example, scanning Wi-Fi, Bluetooth, and/or wired network connections for available devices. The managed device 110 may prepare a list of any discovered IoT devices.

At 1314, the managed device 110 sends IoT device data to the server 120. The IoT device data may include a list of discovered IoT devices, along with information about the discovered devices, such as their makes and models, software versions, firmware versions, MAC addresses, and/or physical locations in the local environment 1110. In an example, the managed device 110 sends the IoT device data through a micro-VPN 134, e.g., within the context of a particular application, such as a workspace application.

At 1316, the server 120 receives the IoT device data and checks whether listed IoT devices are supported. For example, the server 120 queries the IoT manager 1150 for individual IoT devices on the list of discovered IoT devices and determines whether the organization supports those IoT devices.

At 1320, the server 120 returns a list of supported IoT devices to the managed device 110. In an example, the list of supported IoT devices includes all IoT devices on the list of discovered IoT devices which the organization supports.

At 1322, the managed device 110 prompts the user 102 to allow or refuse organizational control over individual IoT devices on the list of supported devices. For example, the managed device 110 may permit the user 102 to allow or refuse management control on a per-device basis. Alternatively, the managed device 110 may require the user 102 to select all or none of the supported devices, or to select any combination thereof.

At 1324, the managed device 110 receives the user selections of supported IoT devices to be controlled. The managed device 110 then initiates a communication 1330 with the server 120 to enroll selected IoT devices. The communication 1330 may be repeated for selected IoT devices on an individual basis, as needed. Alternatively, the communication 1330 may be performed once for all of them together. Although enrollment of a single selected IoT device is described below, one should appreciate that the described activities may be performed for multiple selected IoT devices, e.g., sequentially or in parallel.

At 1332, the managed device 110 sends an enrollment request 1112 to the server 120 to enroll a selected IoT device.

At 1334, the server 120 receives the enrollment request 1112 and obtains, e.g., from the IoT manager 1150, management code for the selected IoT device. The management code may include code for the managed device 110 and code for the IoT device, such as an IoT agent to be installed on the selected IoT device. At 1336 the server 120 returns the management code to the managed device 110.

At 1340, the managed device 110 installs management code for controlling the selected IoT device. This act may involve installing a handler, driver, or other software construct. In some examples, act 1340 may involve establishing network settings for communicating with the selected IoT device. At 1342, the managed device 110 sends the IoT agent to the selected IoT device, and the selected IoT device installs the IoT agent at 1344. At 1346 the IoT device confirms successful installation of the IoT agent.

At 1348, the managed device 110 establishes the local network 1200. If the logical network 1200 is already in place, the managed device 110 may update the logical network 1200 to include the selected IoT device.

At 1350, the managed device 110 confirms successful installation to the server 120. At 1352, the server 120 updates the user profile 1170 of the user 102 to record the fact that the selected IoT device is now a managed IoT device, under management control by the organization.

Going forward, at 1360a, network ingress and egress to and from the now-managed IoT device passes through the managed device 110, which, at 1360b, acts as an intermediary between the managed device 110 and the network 170.

Figure 14:
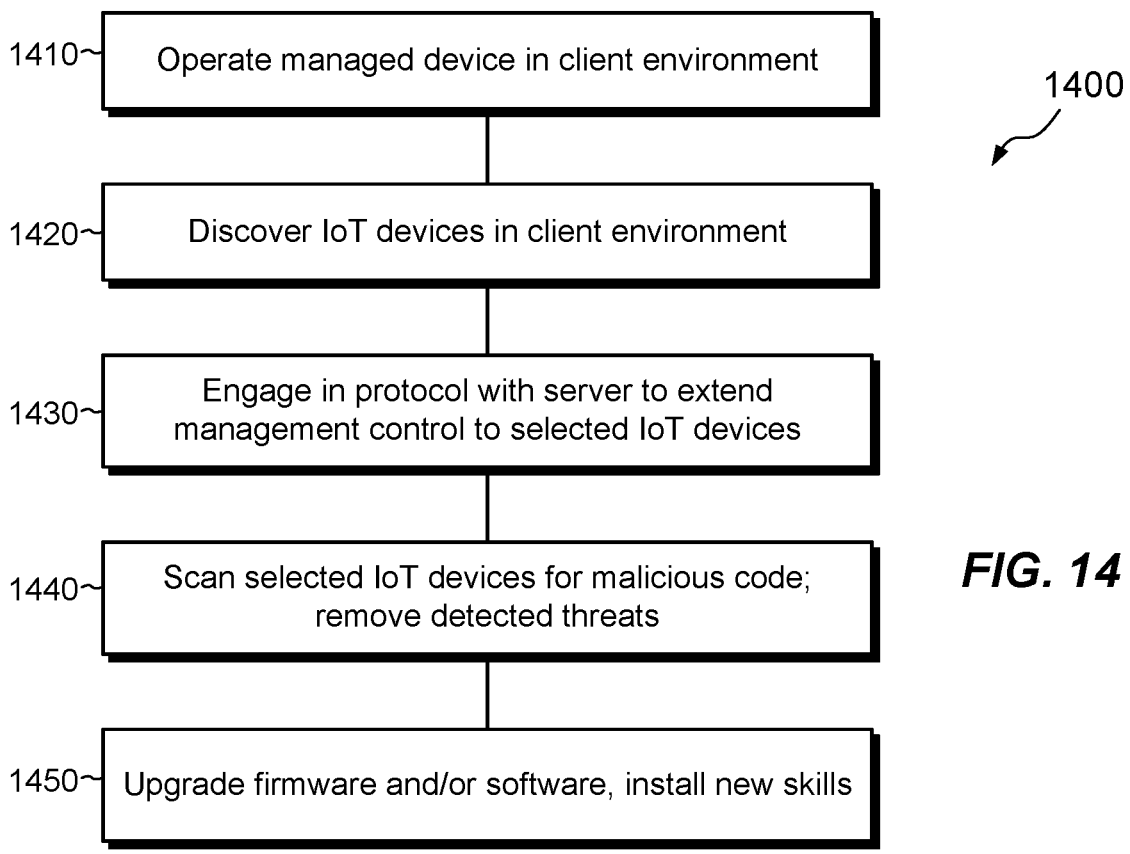
FIG. 14 is a flowchart showing an example method conducted by a managed device for extending management control to IoT devices.
Figure 15:
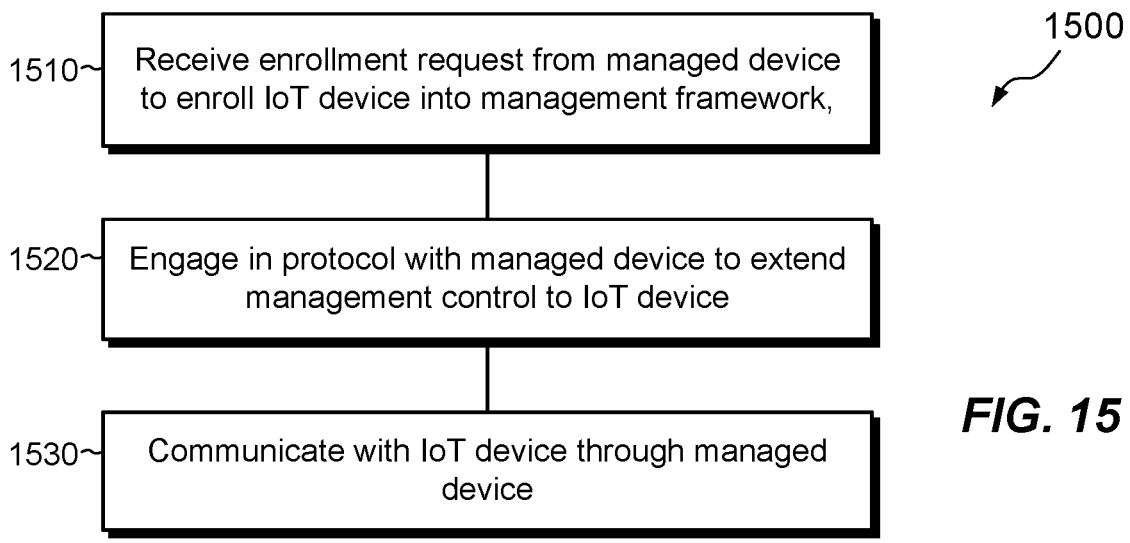
FIG. 15 is a flowchart showing an example method conducted by a server for responding to a request to enroll an IoT device under management of the organization.

FIGS. 14 and 15 show example methods 1400 and 1500 that may be carried out in connection with the environment 1100. The methods 1400 and 1500 are respectively presented from the client and server perspectives. The various acts of methods 1400 and 1500 may be ordered in any suitable way. Accordingly, embodiments may be constructed in which acts are performed in orders different from those shown, which may include performing some acts simultaneously.

In FIG. 14, activity begins at 1410, whereupon the managed device 110 operates in the local client environment 1110. For example, the user 102 may employ the managed device 110 for connecting to the cloud PoP 1120, e.g., for running applications hosted by the server 120. This is not required, however, as the managed device 110 may operate merely by being powered on and idle. No specific activity is required.

At 1420, the managed device 110 performs discovery and locates one or more IoT devices in the local environment 1110. As previously described, discovery may involve scanning wired, Wi-Fi, and Bluetooth networks for IoT devices 1140. The managed device 110 may send the server 120 a list of discovered IoT devices and receive back a list of supported IoT devices, from which the user 102 may select IoT devices for management by the organization.

At 1430, the managed device 110 participates in a communication 1330 with the server 120 to extend management control by the organization to selected IoT devices. In some examples, the communication 1330 involves installing software on the management device 110 and/or installing an agent on each of the IoT devices. The communication 1330 may further involve updating a profile of the user 102 on the server 120 to record the presence of each selected IoT device.

At 1440 in some examples, the managed device 110 may scan the selected IoT device for malicious code, removing any detected threats, such as by deleting the malicious code or quarantining it.

At 1450 in some examples, the managed device 110, operating in coordination with the server 120, upgrades any out-of-date firmware and/or software on the selected IoT devices. In some examples, the managed device 110 also directs the installation of one or more new skills on the selected IoT devices, which may include one or more custom skills developed for the organization.

Turning now to FIG. 15, activity may begin at 1510, whereupon the server 120 receives an enrollment request 1112 from the managed device 110 for enrolling an IoT device 1140 into a management framework of an organization. As described, the management framework may include policies and/or constraints that are required of managed IoT devices, such as being subject to scans for malicious code, software and firmware upgrades, and/or installations of custom skills. The framework may also require network traffic to and from IoT devices to be transmitted locally through the managed device 110 and, outside the local environment 1110, through the server 120.

At 1520, the server 120 participates in a communication 1330 with the managed device 110 to extend management control to the selected IoT device. For example, the communication 1330 may proceed as described in connection with FIG. 13.

At 1530, the server communicates with the IoT device through the managed device 110, e.g., via the logical network 1200.

An improved technique has been described for using a managed device 110 to extend management control by an organization to IoT (Internet of Things) devices 1140 in a local environment 1110 of the managed device 110. The managed device 110 discovers any local IoT devices 1140 and participates in a communication 1330 with a server 120 to bring one or more of the devices 1140 under management control. In some examples, extending management control involves enrolling each selected IoT device 1140 into a management framework of the organization and directing communications between the server 120 and the respective IoT device 1140 through the managed device 110, which provides a point-of-presence for administering management of the selected IoT devices in the local environment 1110.

The following paragraphs (M1) through (M14) describe examples of methods that may be implemented in accordance with the present disclosure:

(M1) A method has been described that involves processing, by a computing device, a request to scan for IoT (Internet of Things) devices in an environment about the computing device, the computing device managed by an entity and communicatively coupled to a server of the entity over a computer network. The method further involves discovering, by the computing device, a set of IoT devices in the environment, the set of IoT devices being unmanaged by the entity, and participating, by the computing device, in a communication with the server to extend management control by the entity to the set of IoT devices, the management control enabling the set of IoT devices to operate in compliance with one or more policies of the entity.

(M2) Another method may be performed as described in paragraph (M1) and may further involve the computing device routing data ingress from the server to the set of IoT devices and routing data egress from the set of IoT devices to the server.

(M3) Another method may be performed as described in any one of paragraphs (M1)-(M2), and may further involve forming a logical network in which the computing device is a hub and the set of IoT devices operatively connect to the hub via respective spokes and directing communications between the set of IoT devices and the server through the computing device acting as the hub of the logical network (M4) Another method may be performed as described in any one of paragraphs (M1)-(M3), and may further involve deploying a management policy for the set of IoT devices, the management policy defined by the entity.

(M5) Another method may be performed as described in any one of paragraphs (M1)-(M4), wherein deploying the management policy includes, for at least one of the set of IoT devices, scanning the respective IoT device(s) for malicious code.

(M6) Another method may be performed as described in any one of paragraphs (M1)-(M5), wherein deploying the management policy includes, for at least one of the set of IoT devices, updating software and/or firmware on the respective IoT device(s).

(M7) Another method may be performed as described in any one of paragraphs (M1)-(M6), wherein deploying the management policy includes, for at least one of the set of IoT devices, installing a set of skills on the respective IoT device(s), the skills developed for the entity.

(M8) Another method may be performed as described in any one of paragraphs (M1)-(M7), and may further involve running a software component on the computing device and directing at least one of the set of IoT devices to be a source for input and/or a destination for output of the software component.

(M9) Another method may be performed as described in paragraph (M8), and may further involve prompting a user to allow the software component to use said at least one of the set of IoT devices for input and/or output of the software component.

(M10) Another method may be performed as described in any one of paragraphs (M8)-(M9), and may further involve orchestrating activities among multiple ones of the set of IoT devices for providing input and/or output of the software component.

(M11) Another method may be performed as described in any one of paragraphs (M8)-(M10), and may further involve, after establishing communication with an IoT device of the set of IoT devices, the computing device handing off communication with IoT device to the server, the IoT device then communicating with the server without routing data through the computing device.

(M12) Another method may be performed as described in paragraph (M7), wherein the set of skills includes a skill that operates an IoT device as a voice assistant for accessing resources of the entity from the server.

(M13) Another method may be perform performed as described in paragraph (M7), wherein the set of skills includes a skill that operates an IoT device as a voice assistant for controlling a function of the computing device, and wherein the method further comprises the computing device responding to control input from the IoT device based on a voice command.

(M14) Another method may be performed as described in any one of paragraphs (M1)-(M3), and may further involve the computing device establishing an application-specific VPN (Virtual Private Network) with the server and conveying network traffic between the server and the set of IoT devices through the application-specific VPN.

In addition, the following paragraphs (D1)-(D3) describes an example of a device that may be implemented in accordance with the present disclosure:

(D1) A device includes control circuitry configured to: process a request to scan for IoT (Internet of Things) devices in an environment about the computing device, the computing device managed by an entity; discover a set of IoT devices in the environment, the set of IoT devices being unmanaged by the entity; and participate in a communication with a server of the entity to extend management control by the entity to the set of IoT devices, the management control enabling the set of IoT devices to operate in compliance with one or more policies of the entity.

(D2) Another device may be provided as described in paragraph (D1), wherein the control circuitry is further configured to: form a logical network in which the computing device is a hub and the set of IoT devices are respective spokes of the hub; and direct communications between the set of IoT devices and the server through the computing device acting as the hub of the logical network.

(D3) Another device may be provided as described in any one of paragraphs (D1)-(D2), wherein the control circuitry is further configured to run a software component on the computing device and direct at least one of the set of IoT devices to be a source for input and/or a destination for output of the software component.

The following paragraphs (MM1) through (MM4) describe further examples of methods that may be implemented in accordance with the present disclosure:

(MM1) A method has been described that includes receiving, by a server, a request from a computing device to enroll an IoT device into an organization into which the computing device is already enrolled, the IoT device disposed in an environment about the managed device. The method further includes, responsive to receiving the request, participating by the server in a communication with the computing device to enroll the IoT device into the organization such that the IoT device becomes subject to one or more policies of the organization, and communicating, by the server, with the enrolled IoT device via the computing device.

(MM2) Another method may be performed as described in paragraph (MM1), and may further involve directing the computing device to scan the IoT device for malicious code.

(MM3) Another method may be performed as described in any one of paragraphs (MM1) through (MM2), wherein communicating with the enrolled IoT device is conducted over an application-specific VPN (Virtual Private Network) established between the server and a software component running on the computing device.

(MM4) Another method may be performed as described in any one of paragraphs (MM1) through (MM3), and may further involve: adding data about the IoT device to a user profile of a user of the computing device; receiving a request from the computing device to operate a software feature; and in response to receiving the request to operate the software feature, (i) identifying the IoT device from the user profile and (ii) directing the software component on the computing device to prompt the user to use the IoT device for providing input and/or output of the software component.

Having described certain embodiments, numerous alternative embodiments or variations can be made. For example, although the local client environment 1110 has been shown and described as the home of a user 102, the local client environment 1110 is not limited to homes and may include any spaces having network connectivity and including one or more IoT devices.

Further, although the logical network 1200 has been shown as a single hub-and-spoke arrangement. Alternatively, the logical network 1200 may be formed from a hierarchy of hub-and-spoke arrangements or from any other type of network arrangement that passes data ingress and egress of IoT devices through the managed device 110.

Further, although embodiments have been described in connection with a user 102, one should appreciate that embodiments are not limited to those that involve a user. For example, authentication may be performed without any user.

Although features have been shown and described with reference to particular embodiments hereof, such features may be included and hereby are included in any of the disclosed embodiments and their variants. Thus, it is understood that features disclosed in connection with any embodiment are included in any other embodiment.

Further, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method for extending management control to IoT (Internet of Things) devices, comprising:
   processing, by a computing device, a request to scan for the IoT devices to extend management control in compliance with one or more policies of an organization entity, the computing device managed by the organization entity and communicatively coupled to a server of the organization entity over a computer network, wherein the IoT devices are enrolled into the organization entity through the server as requested by the computing device;
   discovering, by the computing device, a set of IoT devices from a user profile of a user of the computing device, the set of IoT devices being unmanaged by the organization entity; and
   responsive to the extended management control, enabling the IoT devices to communicate with the server of the organization entity without routing data through the computing device.

2. The method of claim 1, further comprising the computing device routing data ingress from the server to the set of IoT devices and routing data egress from the set of IoT devices to the server.

3. The method of claim 2, further comprising:
   forming a logical network in which the computing device is a hub and the set of IoT devices operatively connect to the hub via respective spokes; and
   directing communications between the set of IoT devices and the server through the computing device acting as the hub of the logical network.

4. The method of claim 3, further comprising deploying a management policy for the set of IoT devices, the management policy defined by the entity.

5. The method of claim 4, wherein deploying the management policy includes, for at least one of the set of IoT devices, scanning the respective IoT device(s) for malicious code.

6. The method of claim 4, wherein deploying the management policy includes, for at least one of the set of IoT devices, updating software and/or firmware on the respective IoT device(s).

7. The method of claim 4, wherein deploying the management policy includes, for at least one of the set of IoT devices, installing a set of skills on the respective IoT device(s), the skills developed for the entity.

8. The method of claim 7, wherein the set of skills includes a skill that operates an IoT device as a voice assistant for accessing resources of the organization from the server.

9. The method of claim 7, wherein the set of skills includes a skill that operates an IoT device as a voice assistant for controlling a function of the computing device, and wherein the method further comprises the computing device responding to control input from the IoT device based on a voice command.

10. The method of claim 4, further comprising:
    running a software component on the computing device; and
    directing at least one of the set of IoT devices to be a source for input and/or a destination for output of the software component.

11. The method of claim 10, further comprising prompting a user to allow the software component to use said at least one of the set of IoT devices for input and/or output of the software component.

12. The method of claim 10, further comprising orchestrating activities among multiple ones of the set of IoT devices for providing input and/or output of the software component.

13. The method of claim 4, further comprising, after establishing communication with an IoT device of the set of IoT devices, the computing device handing off communication with IoT device to the server, the IoT device then communicating with the server without routing data through the computing device.

14. The method of claim 3, further comprising the computing device establishing an application-specific VPN (Virtual Private Network) with the server and conveying network traffic between the server and the set of IoT devices through the application-specific VPN.

15. A computing device for extending management control to IoT (Internet of Things) devices, comprising control circuitry configured to:
   process, by the computing device, a request to scan for the IoT devices to extend management control in compliance with one or more policies of an organization entity, the computing device managed by the organization entity and communicatively coupled to a server of the organization entity over a computer network, wherein the IoT devices are enrolled into the organization entity through the server as requested by the computing device;
   discover, by the computing device, a set of IoT devices from a user profile of a user of the computing device, the set of IoT devices being unmanaged by the organization entity; and
   responsive to the extended management control, enable the IoT devices to communicate with the server of the organization entity without routing data through the computing device.

16. The device of claim 15, wherein the control circuitry is further configured to:
   form a logical network in which the computing device is a hub and the set of IoT devices are respective spokes of the hub; and
   direct communications between the set of IoT devices and the server through the computing device acting as the hub of the logical network.

17. The device of claim 16, wherein the control circuitry is further configured to:
   run a software component on the computing device; and
   direct at least one of the set of IoT devices to be a source for input and/or a destination for output of the software component.

18. A method for extending management control to IoT (Internet of Things) devices, comprising,
   receiving, by a server of an organization entity, a request from a computing device to enroll an IoT device into an organization into which the computing device is already enrolled, the IoT device such that the IoT device becomes subject to one or more policies of the organization entity, wherein the computing device managed by the organization entity and communicatively counted to the server to scan for the IoT device to extend management control in compliance with one or more policies of the organization entity;
   discovering, by the computing device, a set of IoT devices from a user profile of a user of the computing device, the set of IoT devices being unmanaged by the organization entity; and
   responsive to the extended management control, enable the IoT device to communicate with the server of the organization entity without routing data through the computing device.

19. The method of claim 18, further comprising directing the computing device to scan the IoT device for malicious code.

20. The method of claim 18, wherein communicating with the enrolled IoT device is conducted over an application-specific VPN (Virtual Private Network) established between the server and a software component running on the computing device.

21. The method of claim 18, further comprising:
   adding data about the IoT device to a user profile of a user of the computing device;
   receiving a request from the computing device to operate a software feature; and
   in response to receiving the request to operate the software feature, (i) identifying the IoT device from the user profile and (ii) directing the software component on the computing device to prompt the user to use the IoT device for providing input and/or output of the software component.

* * * * *